United States Patent [19]
Ohtake

[11] Patent Number: 5,880,892
[45] Date of Patent: Mar. 9, 1999

[54] VARIABLE FOCAL LENGTH LENS SYSTEM

[75] Inventor: Motoyuki Ohtake, Kawasaki, Japan

[73] Assignee: Nikon Corporation, Tokyo, Japan

[21] Appl. No.: 904,841

[22] Filed: Aug. 1, 1997

[30] Foreign Application Priority Data

Aug. 1, 1996 [JP] Japan .................................. 8-219483
Nov. 6, 1996 [JP] Japan .................................. 8-309973

[51] Int. Cl.⁶ .................................................. G02B 15/14
[52] U.S. Cl. ........................................ 359/683; 359/676
[58] Field of Search .............................. 359/676, 683, 359/686, 689

[56] References Cited

U.S. PATENT DOCUMENTS

| | | | |
|---|---|---|---|
| 5,499,141 | 3/1996 | Ohtake | 359/676 |
| 5,630,181 | 5/1997 | Ohtake | 359/676 |
| 5,668,667 | 9/1997 | Ohtake | 359/676 |
| 5,691,851 | 11/1997 | Nishio et al. | 359/676 |
| 5,781,348 | 7/1998 | Ohtake | 359/676 |

*Primary Examiner*—Scott J. Sugarman
*Attorney, Agent, or Firm*—Chapman & Cutler

[57] ABSTRACT

A variable magnification optical system of reduced size and increased zoom ratio is provided. According to one aspect, a positive lens group having positive refractive power which is disposed closest to an object and an end lens group disposed closest to an image are provided. When lens group positions are changed so that the system changes from the wide-angle state to the telephoto state, the positive lens group and the end lens group move toward the object. In this case, a ratio of the moving amount of the positive lens group to that of the end lens group from the wide-angle state to a given state satisfies a particular condition. A simplified barrel structure results when a particular first supporting element for supporting a first lens group which moves along an optical axis and a particular second supporting element for supporting an end lens group located closer to an image than the first lens group are provided. The second supporting element moves integrally with the end lens group along the optical axis. The second supporting element transmits a rotational driving force applied thereto to the first supporting element and moves along the optical axis in accordance with the rotational driving force. The first supporting element moves along the optical axis in accordance with the rotational driving force transmitted thereto via the second supporting element.

23 Claims, 32 Drawing Sheets

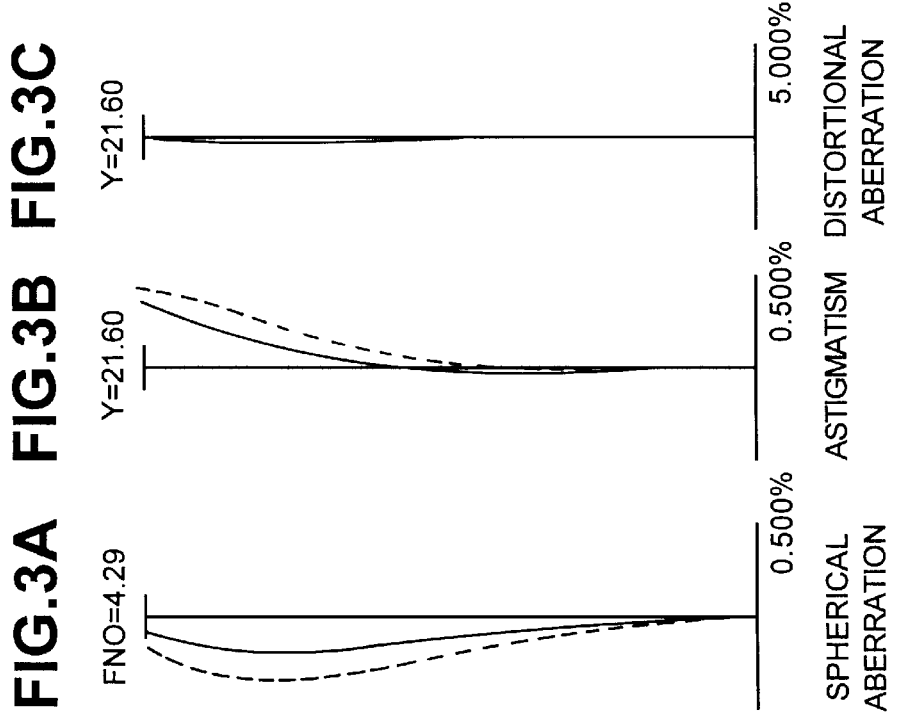
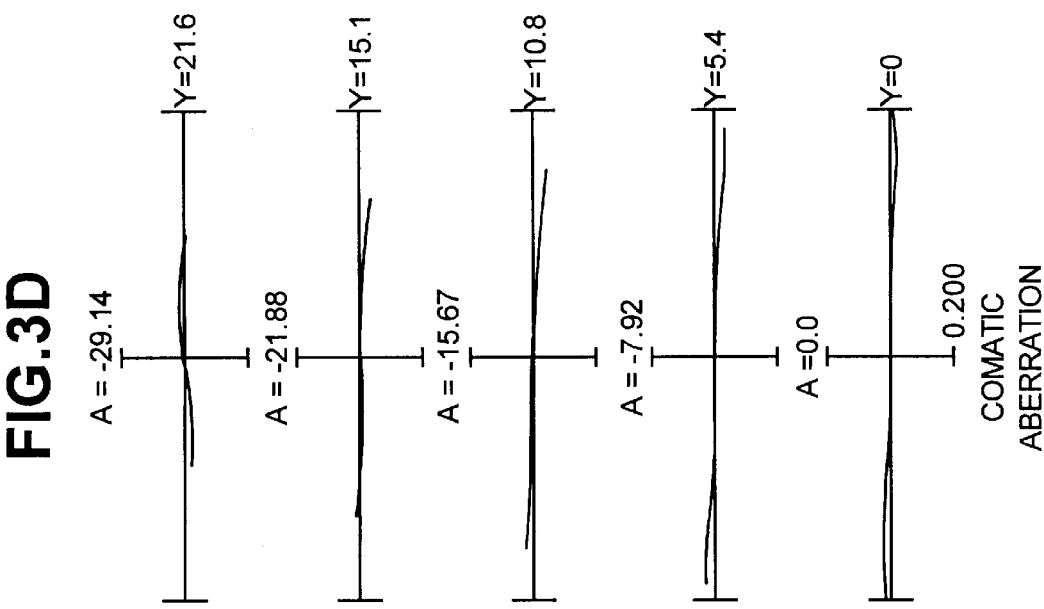

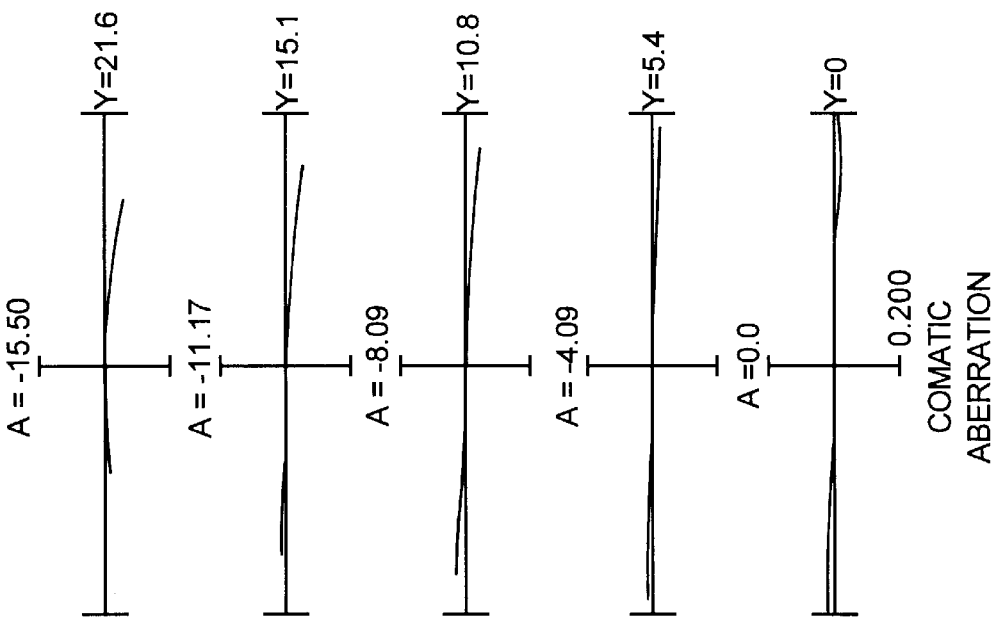
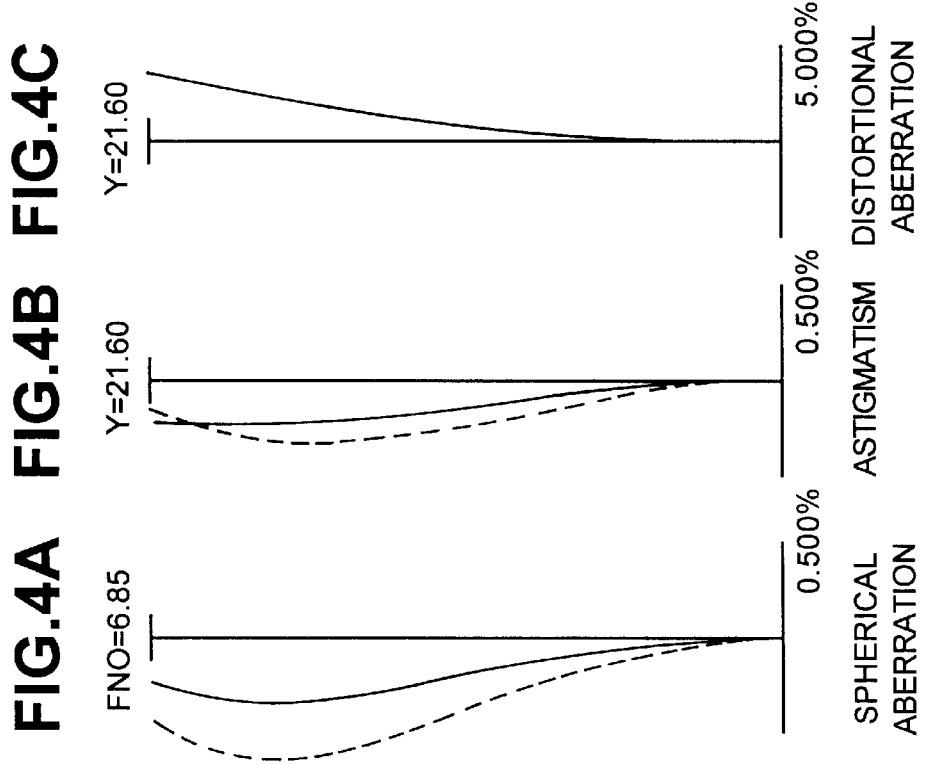

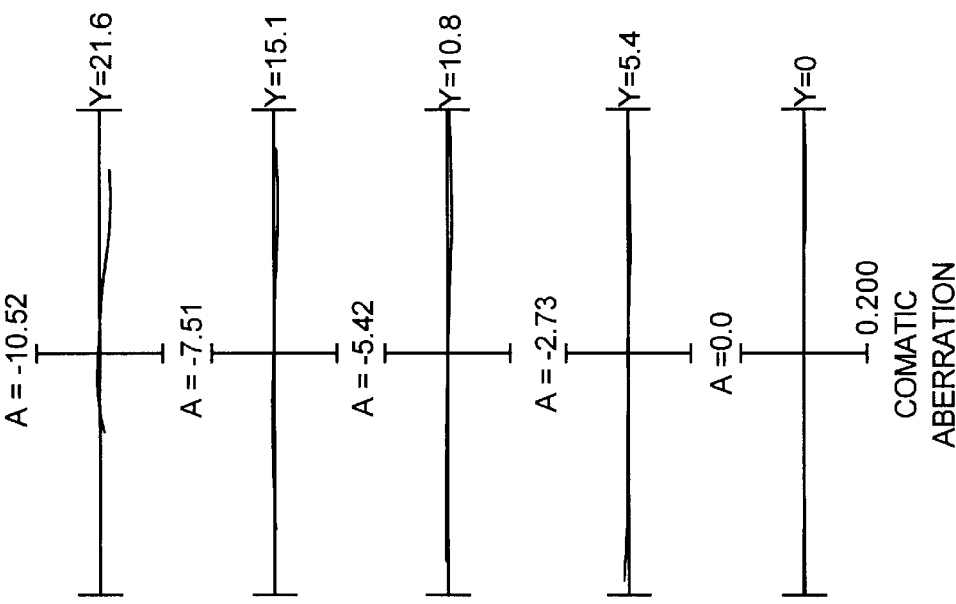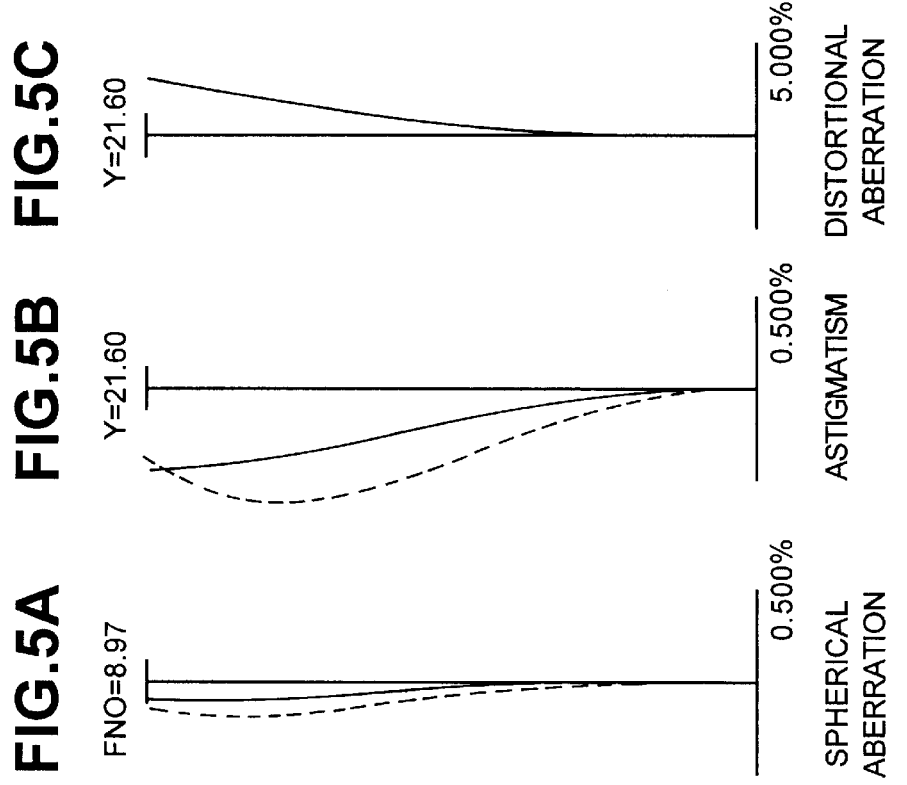

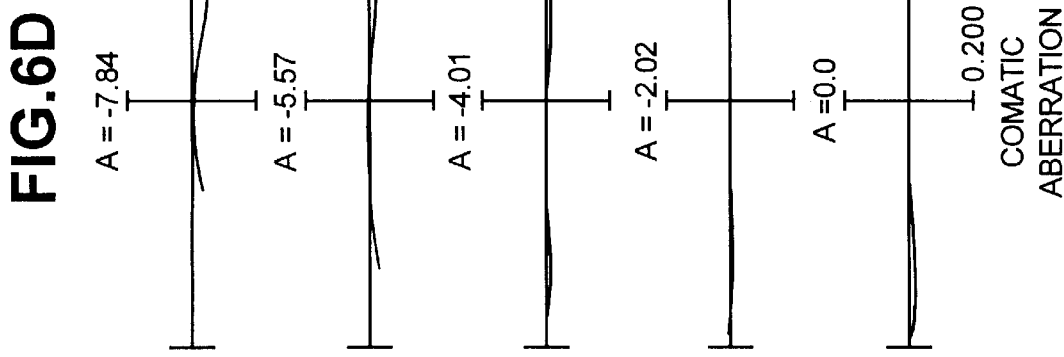
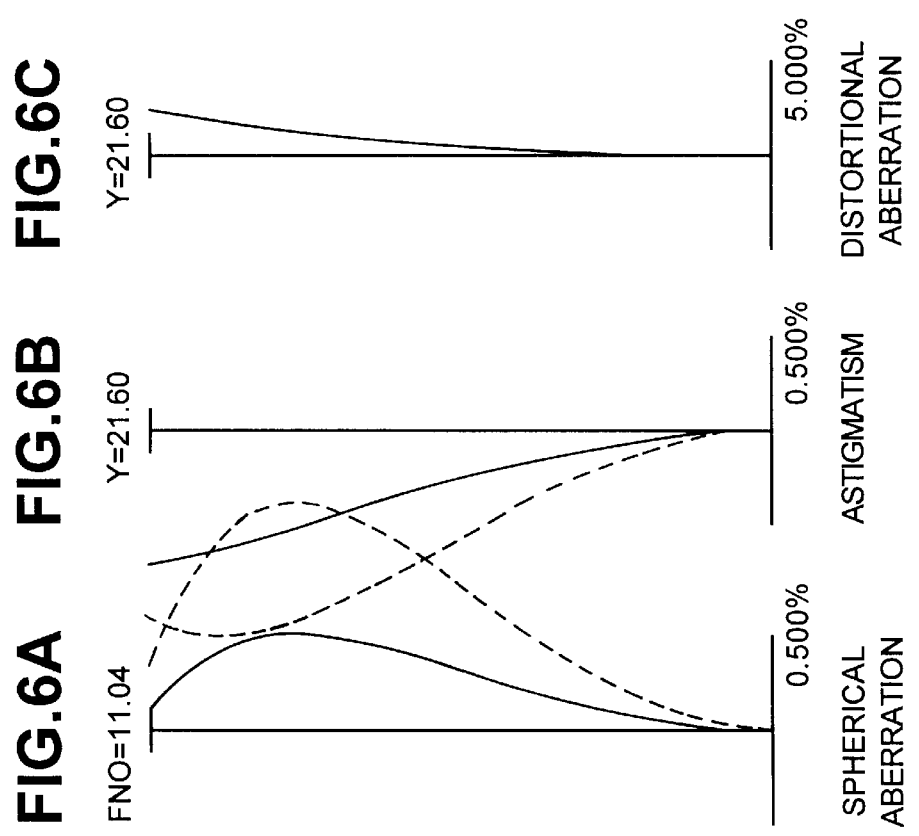

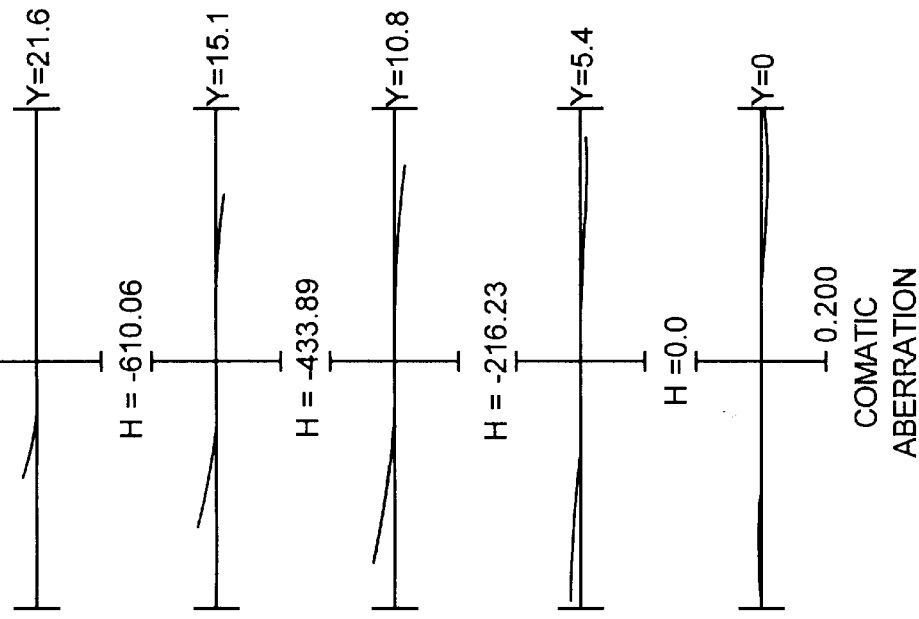
FIG.7A  FIG.7B  FIG.7C  FIG.7D
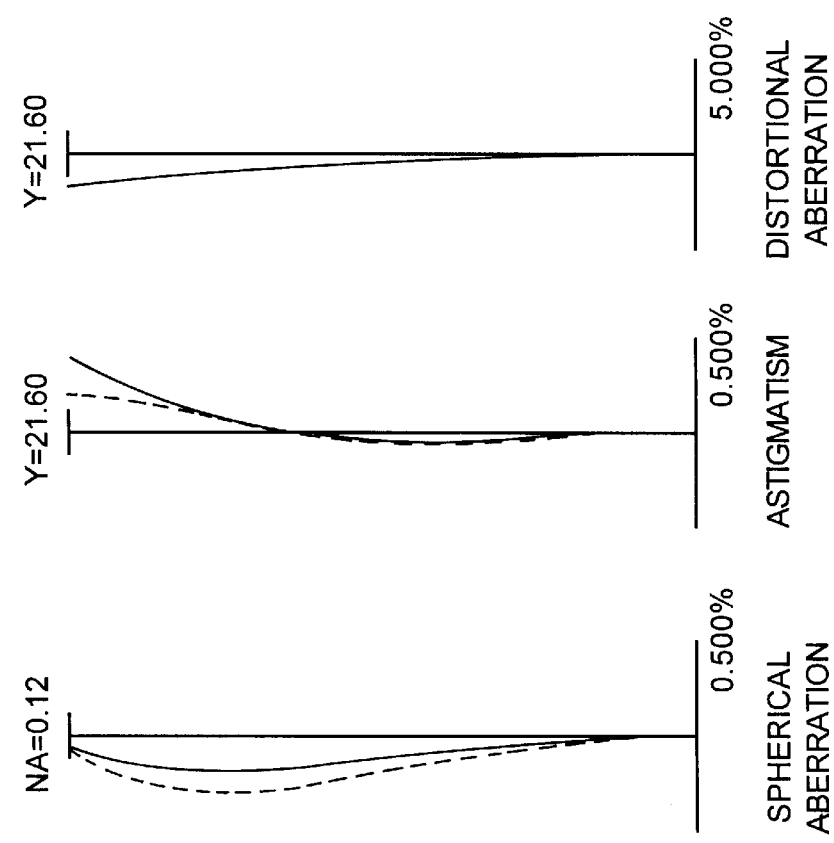

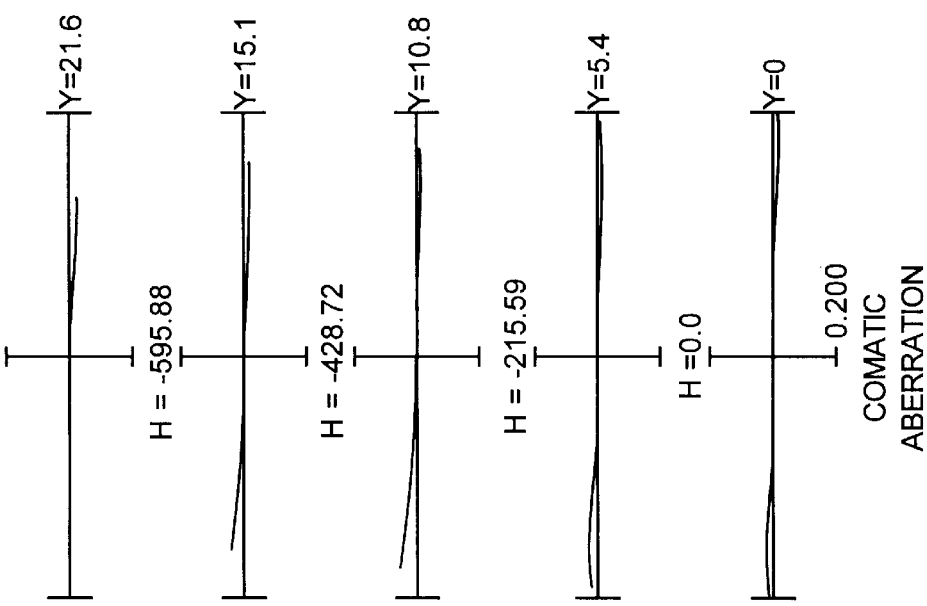
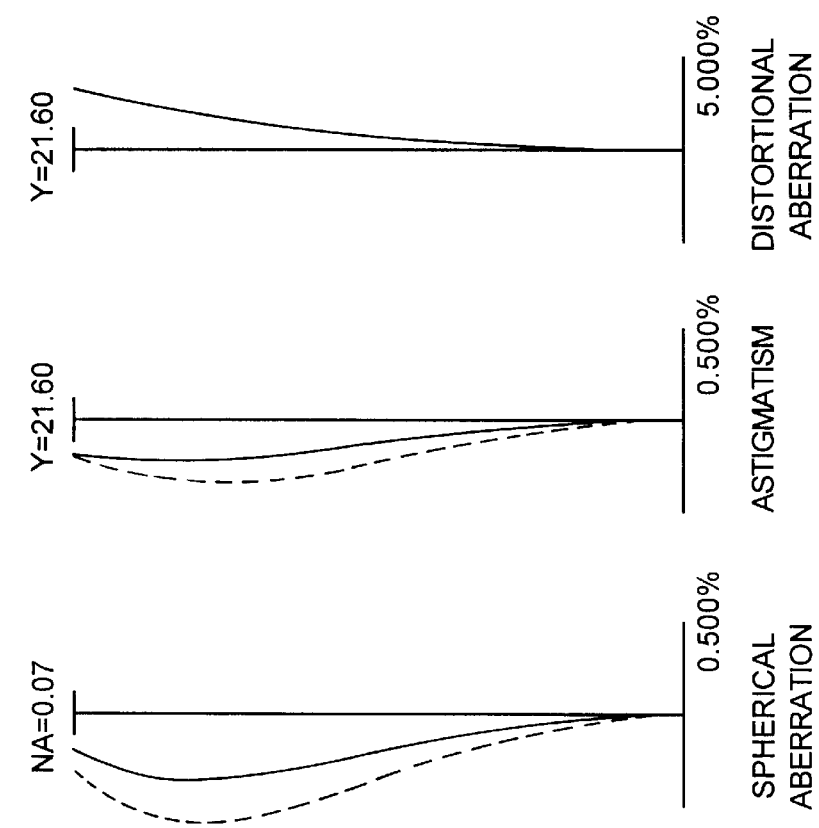

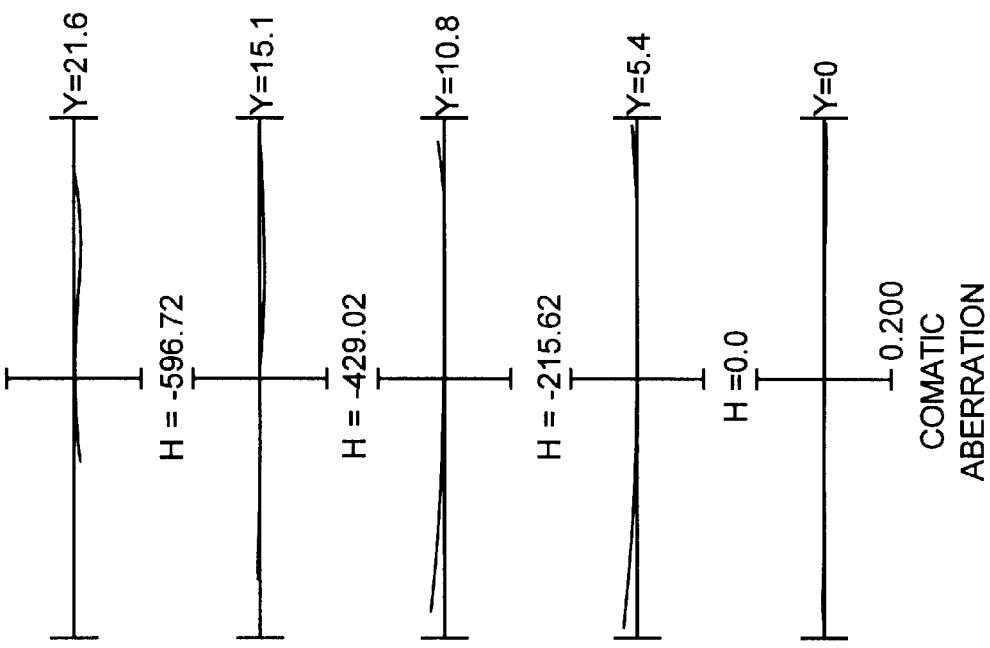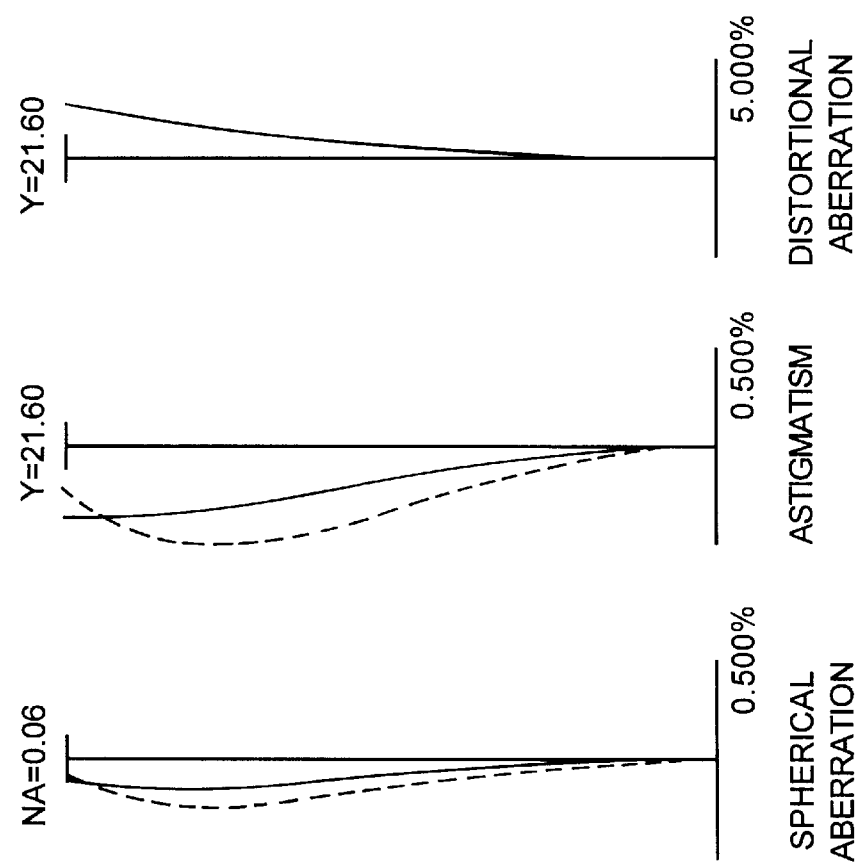

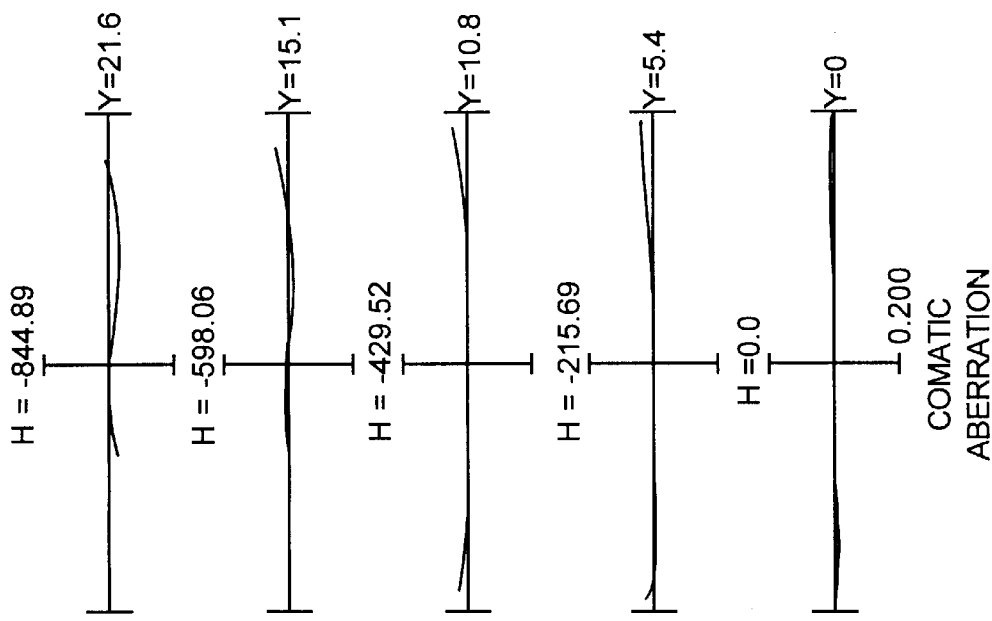
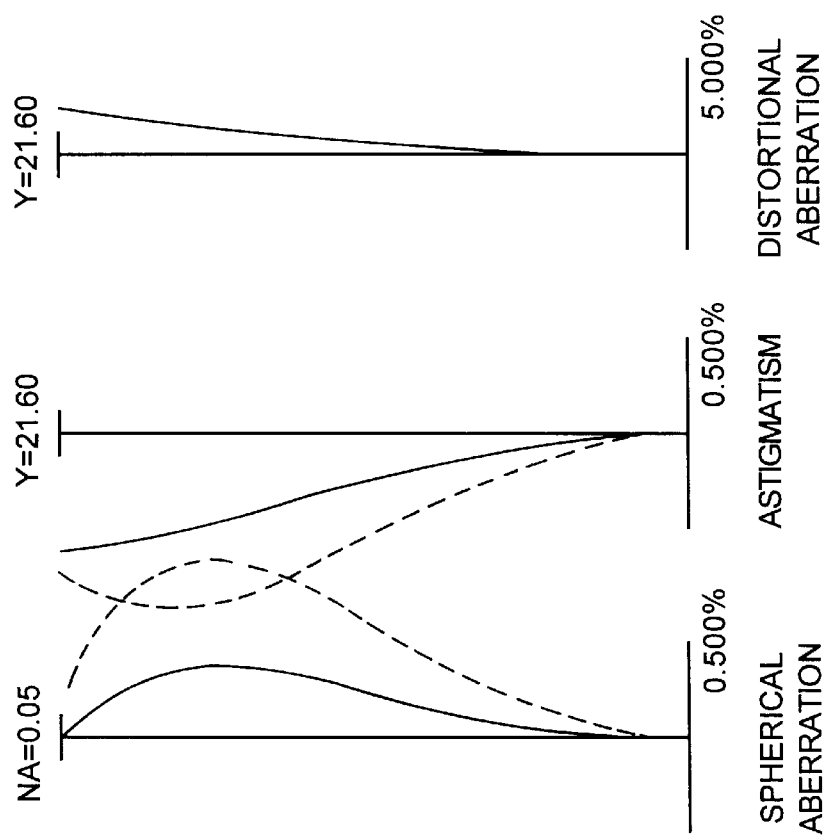

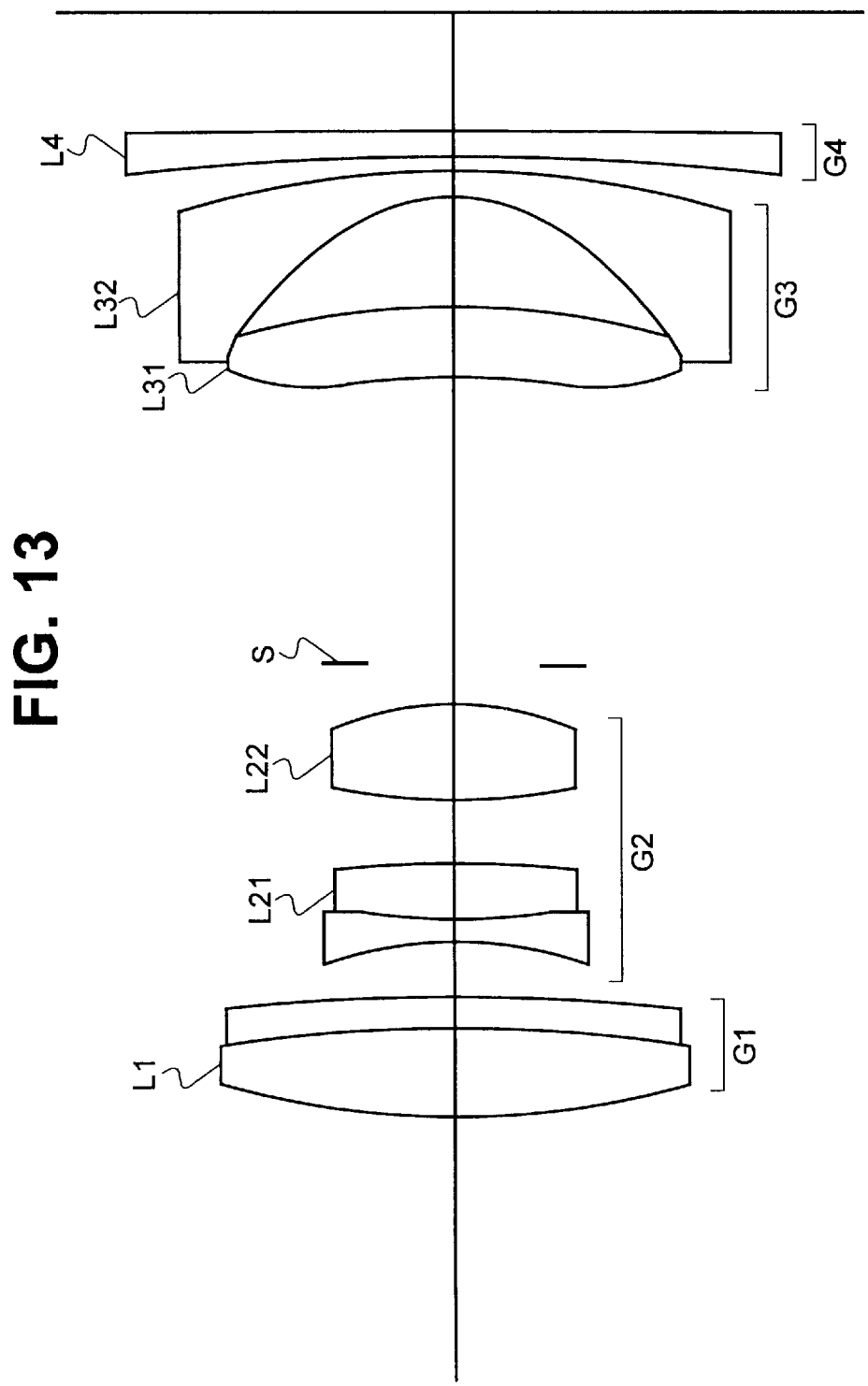

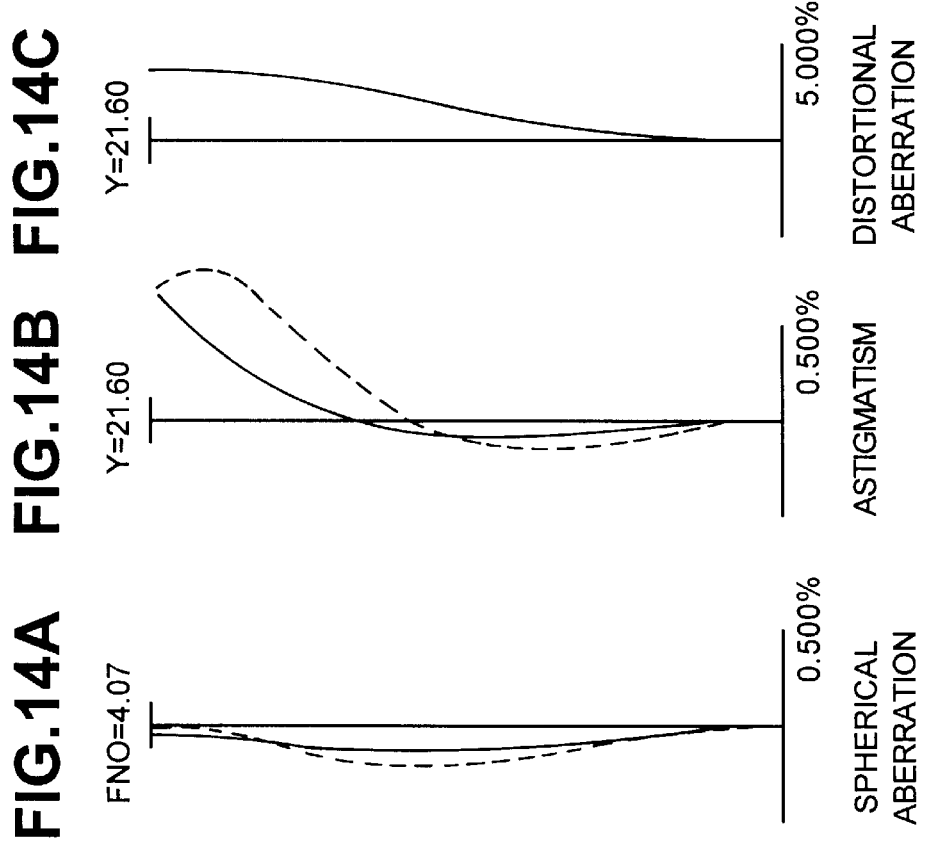

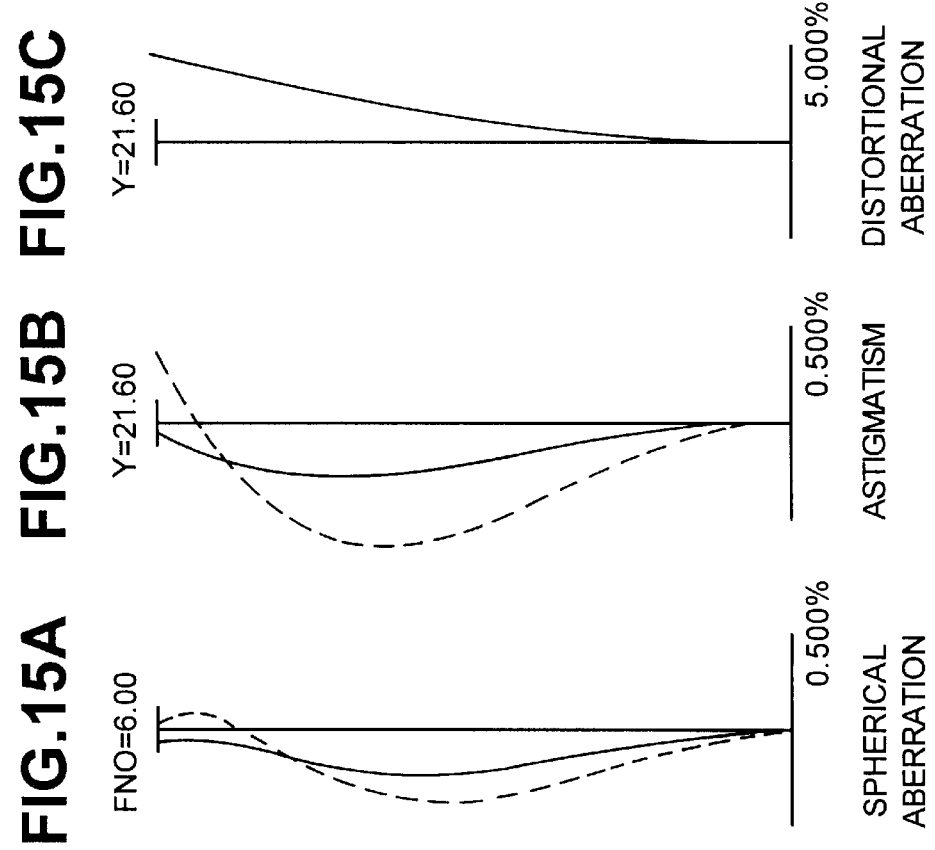

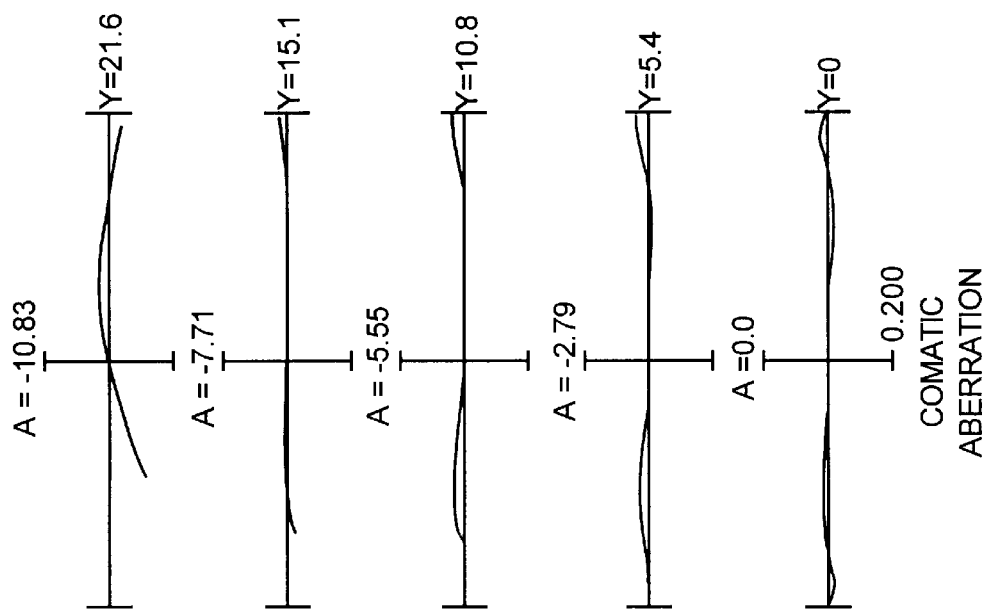
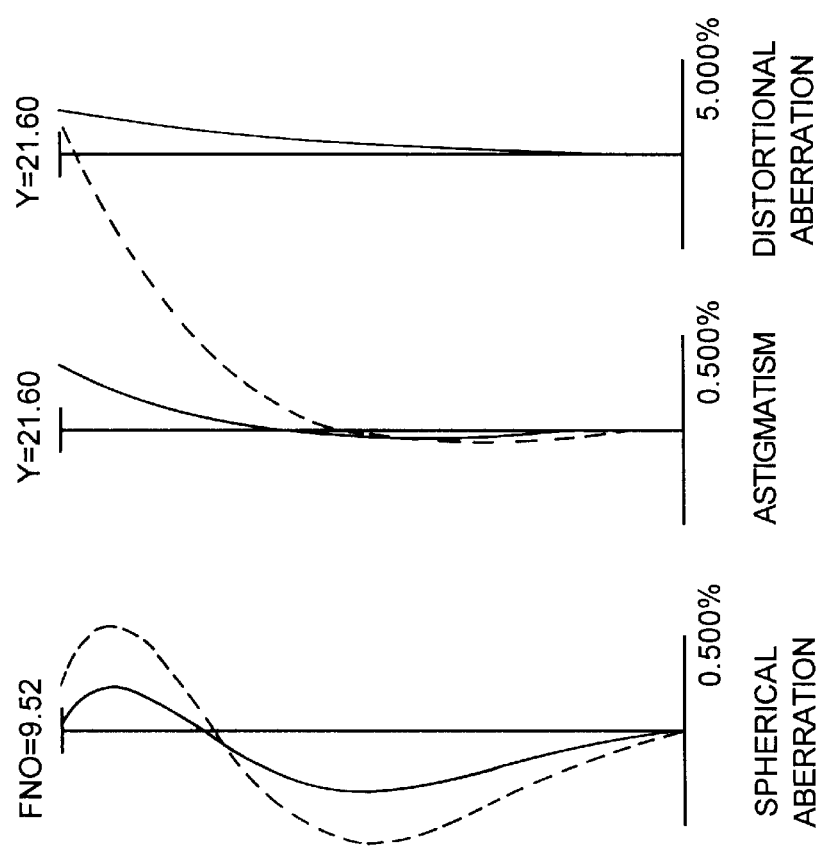

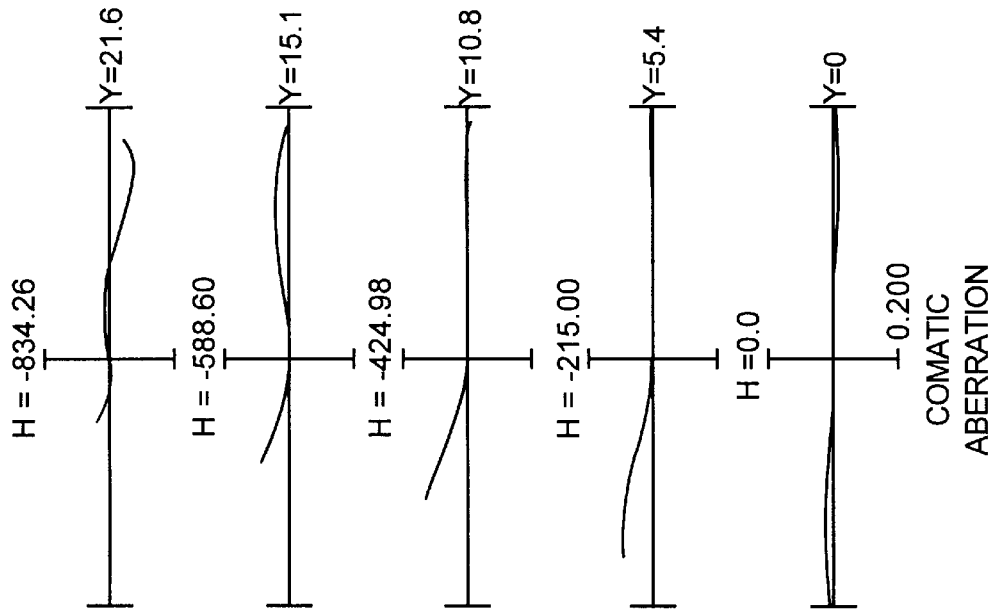
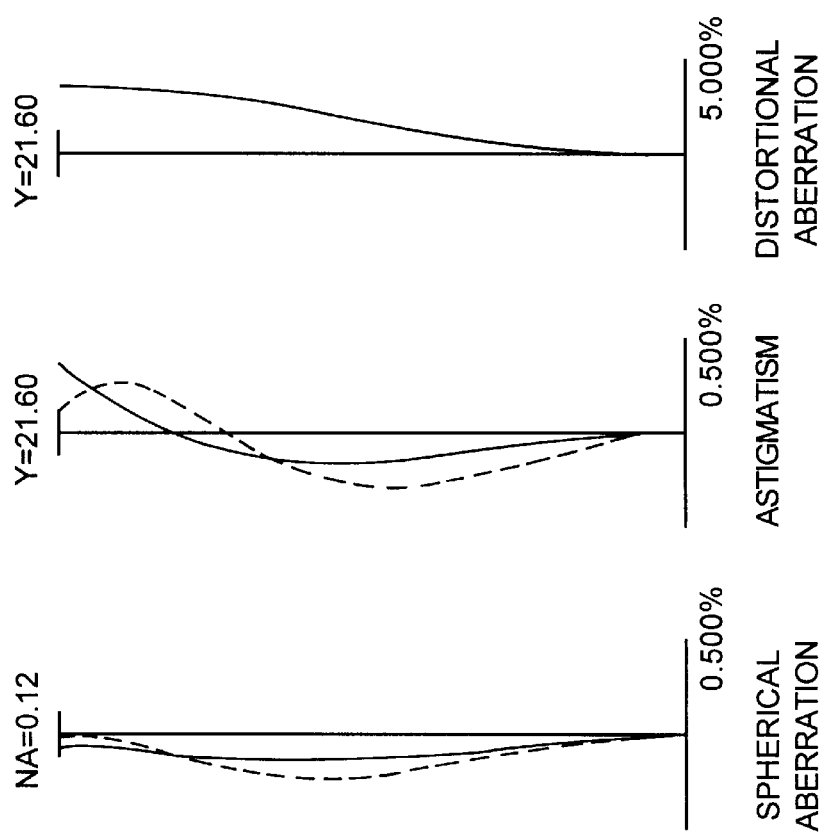

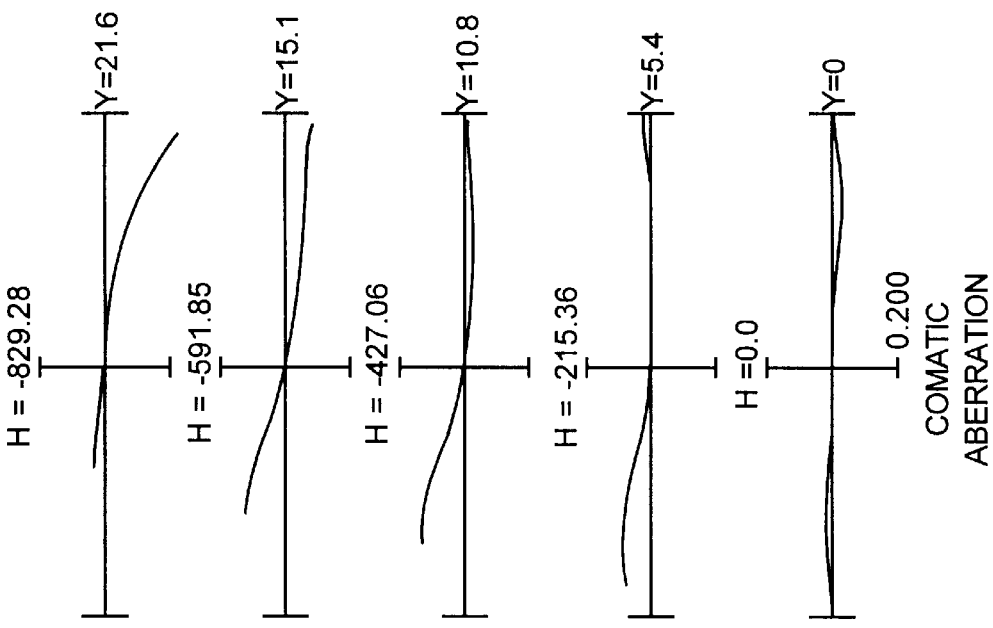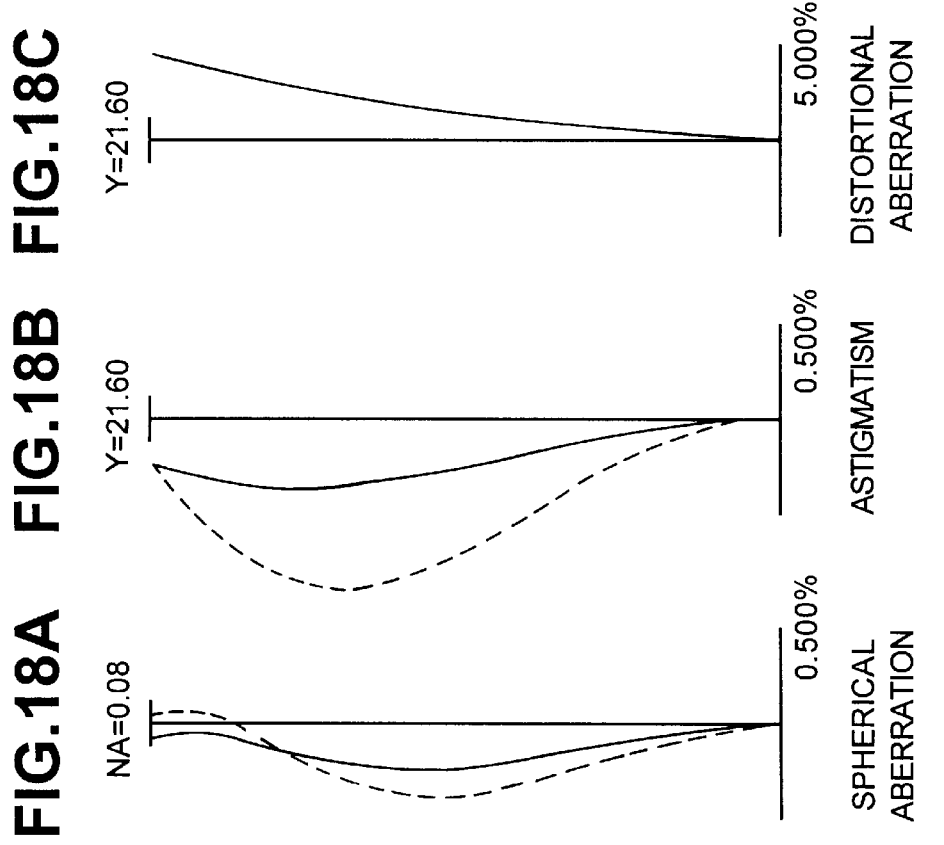

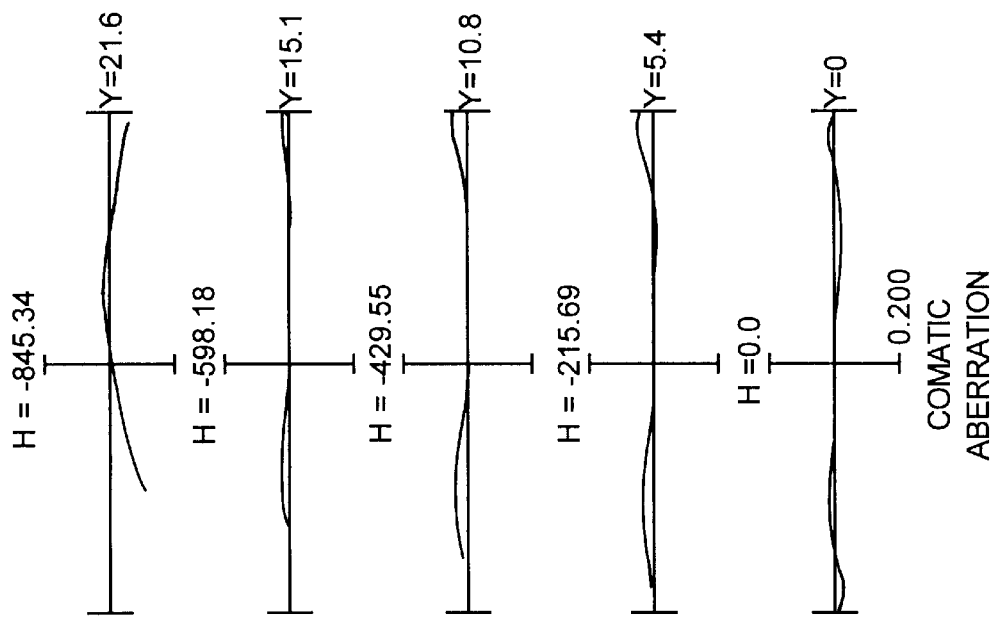
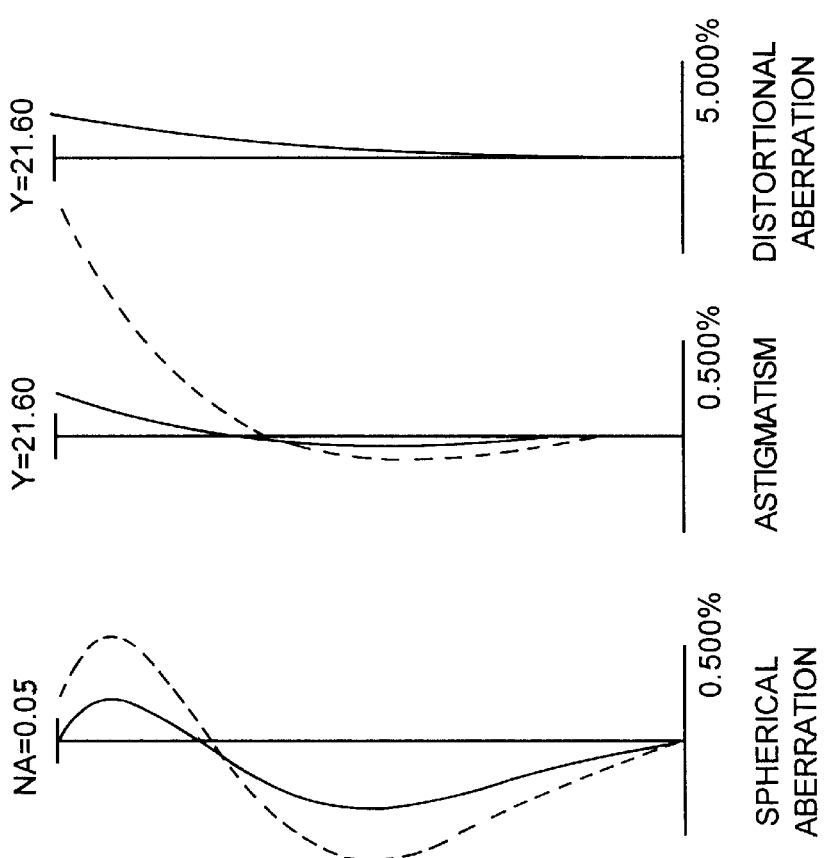

VARIABLE FOCAL LENGTH LENS SYSTEM

BACKGROUND OF THE INVENTION

1. Field of the Invention

The present invention relates to a zoom lens system and, in particular, relates to a zoom lens system including three or more movable lens groups. The invention also relates to a lens-barrel structure for a zoom lens system including multiple lens groups.

2. Description of Related Art

It has recently become common to use a zoom lens in a phototaking optical system used for a camera. In particular, a camera including a high zoom ratio zoom lens having a zoom ratio of more than three is now typical. Moreover, for a lens shutter type camera and an electric still camera, various zoom lenses suitable for reducing sizes and increasing zoom ratios are proposed, since small-sized lightweight cameras are easily portable.

As such a high zoom ratio lens, a zoom lens configured so that three or more lens groups are moved when the focal length is changed, is typically used. This type of zoom lens is referred to as a multi-group zoom lens. There have been various proposals for multi-group zoom lenses.

In a multi-group zoom lens, there is an increased number of spaces between the lens groups which can be changed when the magnification changes, resulting in a complicated lens-barrel structure. Various proposals related to a lens-barrel structure suitable for a multi-group zoom lens or to a lens-barrel structure suitable for reducing the size of the main body of the camera have been made.

A phototaking optical system has a total lens length that becomes longer as the zoom ratio increases. In order to realize a reduction in size of the main body of the camera, it is necessary to make the phototaking optical system thinner so that it may be accommodated in the main body of the camera when the camera is carried. For example, it is known to provide a two-stage barrel accommodating structure in which the lens barrel is divided into two blocks and is accommodated as if the lens barrel is folded.

However, in order to increase the zoom ratio of a zoom lens in which a few of the lens groups are movable, a change in lateral magnification of each lens group associated with the magnification change becomes large. Therefore, it is essential to control the lens group positions with high accuracy in order to obtain a desired optical performance when manufacturing the zoom lens, and it is difficult to shorten the total lens length of the zoom lens.

Furthermore, in a conventional zoom lens, a ratio of the back focal length to the total lens length is large in the telephoto state. Thus, it is easy for a lens-barrel to fall down in the telephoto state, resulting in tilt of an image of an object. This causes the image of the object to be partially blurred.

Additionally, when the number of movable lens groups is increased, the number of movable portions in the lens-barrel is also increased. This causes a degraded optical performance due to fatigue of the movable portions.

SUMMARY OF THE INVENTION

The present invention is made in view of the aforementioned problems and has as one object the provision of a variable focal length optical system or a variable magnification optical system suitable for reducing the size and increasing the zoom ratio of the system.

It is also an object of the present invention to provide such a variable magnification optical system without a complicated lens-barrel structure.

According to one aspect of the present invention, a variable magnification optical system includes a positive lens group G1, having positive refractive power and disposed closest to an object, and an end lens group Ge which is disposed closest to an image. The positive lens group G1 and the end lens group Ge are moved toward the object when a state of lens group positions is changed from a wide-angle state to a telephoto state. The following condition is always satisfied when the state of lens group positions is changed from a wide-angle state to a given state:

$$0.3 < |\Delta Ge/\Delta G1| < 0.6$$

where $\Delta G1$ and $\Delta Ge$ are moving amounts of the positive lens group G1 and the end lens group Ge when the state of lens groups is changed from the wide-angle state to the given state, respectively.

In one preferred embodiment of the present invention, the end lens group Ge has negative refractive power. The optical system further includes a negative lens group Gn having negative refractive power which is disposed adjacent to the object-side of the end lens group Ge. In this case, it is preferable to increase the space between the negative lens group Gn and the end lens group Gn when the state of lens group positions is changed from the wide-angle state to the telephoto state.

In one preferred embodiment of the present invention, the following condition is satisfied.

$$0.8 < f1/(fw \cdot ft)^{1/2} < 1.4$$

Here, f1 is the focal length of the positive lens group G1, fw is the focal length of the variable magnification optical system in the maximum wide-angle state, and ft is the focal length of the variable magnification optical system in the telephoto state. Furthermore, it is preferable that the total lens length TLt and the back focal length Bft in the telephoto state satisfy the following condition.

Bft/TLt<0.5

According to another aspect of the present invention, the optical system includes a first lens group G1 and an end lens group Ge located closer to an image than the first lens group G1. A first supporting means supports the first lens group G1 which moves integrally with the first lens group along an optical axis, and a second supporting means supports the end lens group Ge which moves integrally with the end lens group Ge along the optical axis. The second supporting means transmits a rotation driving force applied thereto to the first supporting means and moves along the optical axis in accordance with the rotation driving force. The first supporting means moves along the optical axis in accordance with the rotation driving force transmitted via the second supporting means.

In one embodiment, the first lens group G1 is disposed closest to an object in the variable magnification optical system and has positive refractive power. It is preferable to dispose the end lens group Ge closest to the image in the variable magnification optical system. A plurality of lens groups is disposed between the first lens group G1 and the end lens group Ge. A negative lens group Gn having negative refractive power is provided adjacent to the object side of the end lens group Ge.

The second supporting means includes a first portion which moves along the optical axis while rotating in accordance with a rotation driving force. A second portion of the second supporting means moves along the optical axis without rotating in accordance with the rotation driving force. The end lens group Ge is supported by the second portion.

It is preferable for the second supporting means to include a guide means for guiding the negative lens group Gn along the optical axis. A ratio of the moving amount of the negative lens group Gn to that of the second supporting means varies when a state of the lens group positions is changed from a wide-angle state to a telephoto state.

BRIEF DESCRIPTION OF THE DRAWINGS

FIGS. 3A–3D are graphs showing various aberrations in the wide-angle state when the optical system is focused at infinity.

FIGS. 4A–4D are graphs showing various aberrations in the first intermediate focal length state when the optical system is focused at infinity.

FIGS. 5A–5D are graphs showing various aberrations in the second intermediate focal length state when the optical system is focused at infinity.

FIGS. 6A–6D are graphs showing various aberrations in the telephoto state.

FIGS. 7A–7D are graphs showing various aberrations in the wide-angle state with an imaging magnification of −1/30.

FIGS. 8A–8D are graphs showing various aberrations in the first intermediate focal length state with an imaging magnification of −1/30.

FIGS. 9A–9D are graphs showing various aberrations in the second intermediate focal length state with an imaging magnification of −1/30.

FIGS. 10A–10D are graphs showing various aberrations in the telephoto state with an imaging magnification of −1/30.

FIGS. 11A and 11B are cross-sectional views illustrating a lens-barrel incorporating the variable magnification optical system of FIG. 2 and in which FIG. 11A illustrates the lens-barrel in its wide-angle state and FIG. 11B illustrates the lens-barrel in its telephoto state.

FIG. 13 is a view schematically showing the configuration of the variable magnification optical system according to the embodiment of the present invention shown in FIG. 12.

FIGS. 14A–14D are graphs showing various aberrations in the wide-angle ate when the optical system is focused at infinity.

FIGS. 15A–15D are graphs showing various aberrations in the intermediate focal length state when the optical system is focused at infinity.

FIGS. 16A–16D are graphs showing various aberrations in the telephoto state when the optical system is focused at infinity.

FIGS. 17A–17D are graphs showing various aberrations in the wide-angle state with an imaging magnification of −1/40.

FIGS. 18A–18D are graphs showing various aberrations in the intermediate focal length state with an imaging magnification of −1/40.

FIGS. 19A–19D are graphs showing various aberrations in the telephoto state with an imaging magnification of −1/40.

FIGS. 20A and 20B are cross-sectional views illustrating a lens-barrel incorporating the variable magnification optical system of FIG. 13 and in which FIG. 20A illustrates the lens-barrel in its wide-angle state and FIG. 20B illustrates the lens-barrel in its telephoto state.

DESCRIPTION OF THE PREFERRED EMBODIMENTS

Figure 1:
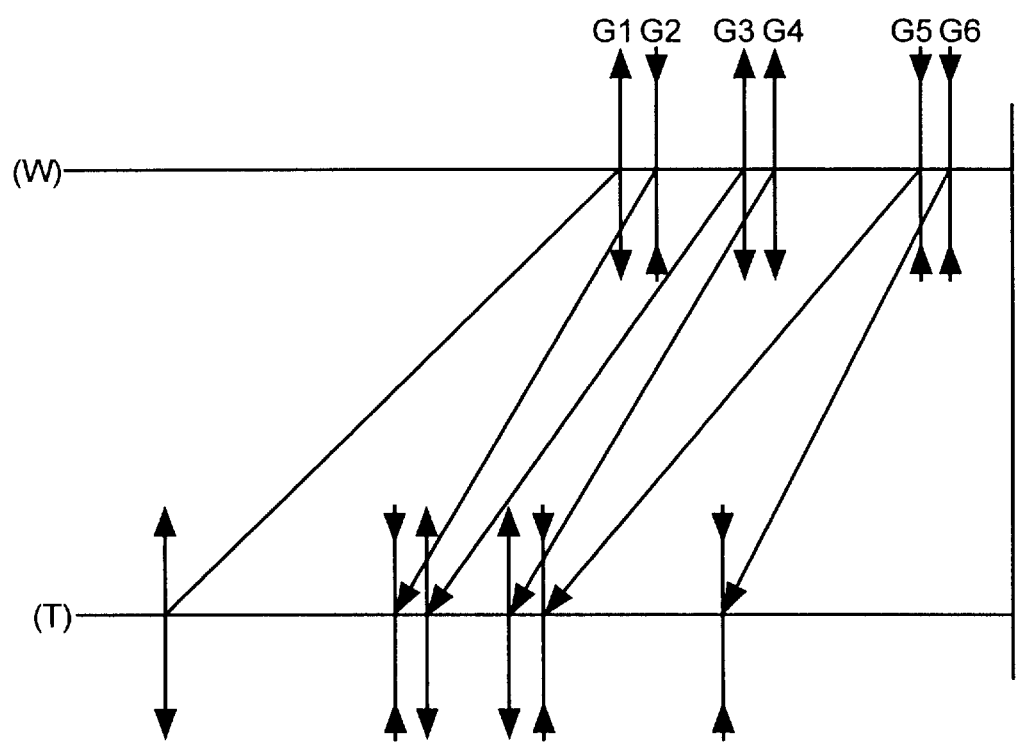
FIG. 1 is a diagram showing a distribution of refractive power in a variable magnification optical system according to one embodiment of the present invention and represents a change in state of lens group positions from the wide-angle state (W) to the telephoto state (T).

A lens-integrated camera, such as a camera of a lens shutter type which incorporates an imaging lens system in a main body of the camera, has no limitation to the back focal length of the imaging lens system. Therefore, as the imaging lens system used for such a camera, a telephoto-type zoom lens, in which a negative lens group is disposed closest to an image, is used.

A telephoto-type zoom lens uses a negative lens group for increasing the zoom ratio when the state of lens group positions of the zoom lens is changed from a wide-angle state (a state providing the shortest focal length of the zoom lens) to a telephoto state (a state providing the longest focal length of the zoom lens). The magnitude of the lateral magnification of the negative lens group is larger in the telephoto state than in the wide-angle state.

An aperture diaphragm is disposed closer to an object than the negative lens group. The space between the aperture diaphragm and the negative lens group is made narrower when the state of lens group positions in the zoom lens is changed from the wide-angle state to the telephoto state. Therefore, off-axis light flux passes through the negative lens group away from an optical axis of the zoom lens in the wide-angle state. On the other hand, in the telephoto state, the off-axis light flux passes close to the optical axis of the zoom lens when passing through the negative lens group. Accordingly, excellent compensation for variation of off-axis aberration occurring by way of a change in each lens position state can be made and high performance can be realized.

However, when the back focal length in the wide-angle state is too short, a shadow produced by dust which is attached to the image-side face of the negative lens group is also recorded on a film surface. Thus, it is desirable to set the back focal length in the wide-angle state to an appropriate value.

Moreover, when a positive lens group is disposed closest to the object in the zoom lens and the total lens length of the zoom lens (the length from the most objectwise lens surface to the image side along the optical axis) in the wide-angle state is made short, the off-axis light flux can pass closer to the optical axis of the zoom lens when passing through the positive lens group. In the telephoto state, the total lens length of the zoom lens is made shorter by making the space between the positive lens group and a lens group disposed on the image side of the positive lens group (which is disposed adjacent to the image-side of the positive lens group in the wide-angle state) larger so that the positive lens group causes the light flux to strongly converge.

For example, as a specific configuration of the multi-group zoom lens which is suitable for reducing the size and increasing the zoom ratio, the following zoom lens configurations are known: a three-group type comprising, from the object side, a positive lens group, a positive lens group and a negative lens group; a four-group type comprising, from the object side, a positive lens group, a negative lens group, a positive lens group and a negative lens group; and a five-group type comprising, from the object side, a positive lens group, a negative lens group, a positive lens group, a positive lens group and a negative lens group.

In any of the above-listed zoom lens configurations, the positive lens group is disposed closest to the object among the lens groups, while the negative lens group is disposed closest to the image. In addition, between the positive lens group disposed closest to the object and the negative lens group disposed closest to the image, either one positive lens group or a plurality of lens groups collectively having a positive refractive power is disposed. All of the lens groups included in the zoom lens are moved toward the object during a magnification change from the wide-angle state to the telephoto state.

When the back focal length in the wide-angle state is set to an appropriate value, the lateral magnification of the negative lens group is substantially the same as the value of the back focal length in the wide-angle state. On the other hand, the lateral magnification of the negative lens group becomes larger in the telephoto state as the zoom ratio of the zoom lens increases. Thus, lens position control with higher accuracy is required. Accordingly, it is necessary to suppress the lateral magnification of the negative lens group in the telephoto state, since the required accuracy of the lens position control becomes a great deal higher when the zoom ratio of the zoom lens increases.

For example, according to a zoom lens configuration disclosed in either Japanese Patent Laid-Open Publication No. 7-13080 or Japanese Patent Laid-Open Publication No. 7-72392, a lens group having negative refractive power is further added on the image-side of the negative lens group, thereby making the lateral magnification of the negative lens group in the telephoto state smaller. However, in such a configuration, the moving amount of the negative lens group closest to the image from a position in the wide-angle state to a position in a given state of lens group positions is larger as compared to a change in the total lens length of the zoom lens. Therefore, the back focal length in the telephoto state is large. The lens-barrel falls down easily as a result.

According to the present invention, the lens groups are configured to satisfy the following conditions 1 to 3 and eliminate the problems discussed above.

1. Two negative lens groups are disposed closest to the image plane among the lens groups of the zoom lens. These negative lens groups are moved so that the space between the two negative lens groups is made larger when the lens group positions are changed from the wide-angle state to the telephoto state.

2. A positive lens group is disposed closest to the object among the lens groups of the zoom lens.

3. At least one lens group is disposed between the positive lens group and the two negative lens groups.

Conventionally, a telephoto ratio is known to be an indication of reducing the size of the lens system. The telephoto ratio is a value obtained by dividing the total lens length (a distance on the optical axis of the lens between a face closest to the object and a face closest to the image) by the focal length.

When a positive lens group is arranged so as to be spaced from a negative lens group, if the focal length of the entire lens and the telephoto ratio are assumed to be constant, then the space between the positive lens group and the negative lens group gets larger as the refractive power of the negative lens group becomes larger. When the negative lens groups are arranged so as to be spaced from each other, the total refractive power of the negative lens groups, which is negative, becomes stronger.

Therefore, according to the present invention, by satisfying condition 1, the total refractive power of the two negative lens groups, which is negative, can be made stronger. In addition, the positions of the negative lens groups in the telephoto state are moved toward the image. Consequently, a ratio of the back focal length to the total lens length of the entire lens can be reduced, and the lens-barrel is prevented from falling down.

A telephoto type arrangement of refractive power is effective for shortening the total lens length. Therefore, according to the present invention, condition 2 is necessary because the present invention realizes the shorter total length of the zoom lens by disposing the positive lens group closest to the object among the lens groups of the zoom lens.

However, in a two-group arrangement type comprising, from the object side, a positive lens group and a negative lens group, the space between the positive lens group and the negative lens group is smaller in the telephoto state than in the wide-angle state. In particular, when the zoom ratio of the zoom lens is high, the back focal length is increased greatly with respect to the total lens length, resulting in the fall down of the lens-barrel. Thus, according to the present invention, the total lens length in the telephoto state is made shorter by disposing one lens group or a plurality of lens groups between the positive lens group and the negative lens group so as to suppress falling down of the lens-barrel. Accordingly, condition 3 set forth above is necessary.

Various conditions according to the present invention will now be described.

According to the present invention, the following condition is satisfied.

$$0.3 < |\Delta Ge/\Delta G1| < 0.6 \tag{1}$$

where $\Delta G1$ is the moving amount of the positive lens group G1 from the wide-angle state to a given state of lens group positions; and $\Delta Ge$ is the moving amount of the end lens group Ge from the wide-angle state to the given state.

Condition (1) defines an appropriate range of a ratio of the moving amount of the end lens group Ge to that of the positive lens group G1 from the wide-angle state to the given state which is between the wide-angle state and the telephoto state.

When this ratio exceeds the upper limit of condition (1), a ratio of the back focal length to the total lens length in the telephoto state becomes large. As a result, the image blur caused by camera shaking makes the optical performance bad.

On the other hand, when the aforementioned ratio of the moving amounts of the positive lens group and the negative lens group falls below the lower limit of condition (1), the height of the off-axis light flux passing through the end lens group Ge is changed less while the end lens group Ge moves from the wide-angle state to the telephoto state. As a result, variation in off-axis aberration associated with the magnification change cannot be suppressed.

The upper limit of condition (1) is preferably set to be 0.55 in order to further suppress the fall down of the lens-barrel.

Moreover, in order to reduce an error in lens position which is generated during a manufacturing process, it is preferable to have a value of condition (1) (i.e., the ratio of the moving amounts of the end lens group Ge and the positive lens group G1) be substantially constant in a given state of lens group positions from the wide-angle state to the telephoto state.

Furthermore, according to the present invention, it is preferable, for shortening the total lens length in the telephoto state, to satisfy the following condition (2).

$$0.8 < f1/(fw \cdot ft)^{1/2} < 1.4 \tag{2}$$

where f1 is the focal length of the positive lens group G1;

fw is the focal length of the whole lens system in the wide-angle state; and ft is the focal length of the whole lens system in the telephoto state.

Condition (2) defines an appropriate range of the focal length f1 of the positive lens group G1 which is disposed closest to the object in the lens system.

When $f1/(fw \cdot ft)^{1/2}$ exceeds the upper limit of condition (2), a convergence effect provided by the positive lens group G1 becomes weaker and, therefore, the size of the lens system becomes larger. This is undesirable.

On the other hand, when $f1/(fw \cdot ft)^{1/2}$ falls below the lower limit of condition (2), the convergence effect provided by the positive lens group becomes stronger. As a result, the off-axis light flux passing through the positive lens group G1 passes away from the optical axis of the lens, particularly in the telephoto state, and the size of the lens becomes larger. This is also undesirable.

Furthermore, according to the present invention, it is preferable to satisfy the following condition (3) in order to more reliably prevent occurrence of the fall down of the lens-barrel, which tends to occur in the telephoto state.

$$Bft/TLt < 0.5 \tag{3}$$

Here TLt is the total lens length in the telephoto state; and

Bft is the back focal length in the telephoto state.

Condition (3) defines an appropriate range of a ratio of the back focal length to the total lens length in the telephoto state.

When this ratio exceeds the upper limit of condition (3), the fall down of the lens-barrel occurs easily in the telephoto state, resulting in partial blurring of the image. This is undesirable.

Furthermore, according to the present invention, it is preferable for the end lens group Ge to have a negative refractive power and to satisfy the following condition (4) in order to shorten the total lens length.

$$-5 < fe/(fw \cdot ft)^{1/2} < -1 \tag{4}$$

Here, fe is the focal length of the end lens group Ge.

Condition (4) defines an appropriate range of the refractive power of the end lens group Ge.

When $fe/(fw \cdot ft)^{1/2}$ exceeds the upper limit of condition (4), the refractive power distribution becomes more asymmetric in the telephoto state. Therefore, it becomes harder to adequately compensate for positive aberration.

When $fe/(fw \cdot ft)^{1/2}$ falls below the lower limit of condition (4), the divergence effect provided by the end lens group Ge becomes weaker. This results in difficulty in reducing the total lens length.

According to the present invention, when one movable lens group Ga is disposed between the positive lens G1, which is located closest to the object in the lens system, and the two negative lens groups Gn and Ge, which are located closet to the image in the lens system, it is desirable to compose the movable lens group Ga of a negative portion group and a positive portion group disposed adjacent to an image-side of the negative portion group. The reasons for this will be explained.

In order to obtain an appropriate back focal length in the wide-angle state, it is desirable to diverge light flux which is converged by the positive lens group G1 by the negative portion group of the movable lens group Ga. Moreover, due to the negative portion group, excellent compensation for positive distortion aberration generated in the two negative lens groups Gn and Ge in the wide-angle state can be made. Furthermore, the light flux is influenced by the divergence effect while passing through the negative portion group of the movable lens group Ga. For the above reasons, it is desirable to dispose the positive portion group on the image-side of the negative portion group.

When a plurality of movable lens groups is disposed between the positive lens group G1 located closest to the object in the lens system and the two negative lens groups Gn and Ge located closest to the image in the lens system, it is preferable for the movable lens groups include a lens group Ga having negative refractive power disposed adjacent to the image-side of the positive lens group G1 and a lens group Gb having positive refractive power disposed adjacent to the object-side of the two negative lens groups Gn and Ge. The total refractive power of the movable lens groups is always positive during the magnification. The reasons for this will be described.

To obtain an appropriate back focal length in the wide-angle state, it is desirable to diverge the light flux converged by the positive lens group G1 by using the lens group Ga having the negative refractive power. Moreover, due to the negative lens group Ga, excellent compensation for positive distortion aberration generated in the two negative lens groups Gn and Ge in the wide-angle state can be made. Furthermore, the light flux is influenced by the divergence effect of the lens group Ga. For the above reasons, it is desirable to dispose the lens group Gb having the positive refractive power on the image-side of the lens group Ga.

In addition, according to the present invention, it is preferable to keep a ratio of the moving amount of the positive lens group G1 to that of the end lens group Ge from the wide-angle state to a given state substantially constant. In this case, the positive lens group G1 and the end lens group Ge can be moved by a linear cam, thereby improving the accuracy of the lens position control.

As a zoom lens-barrel suitable for size reduction, a two-stage barrel accommodating structure has been known.

The two-stage barrel accommodating structure is composed of a first lens-barrel, a second lens-barrel, a black box and a driving motor. The first lens-barrel and the second lens-barrel are tightly fitted to each other with helicoids and the second lens-barrel is tightly fitted to the black box with helicoids. The second lens-barrel moves in the optical axis direction while being rotated by the driving motor. The first lens-barrel moves relative to the second lens-barrel in the optical axis direction as a result of the rotational power of the second lens-barrel. The positive lens group G1 is fixed to the first lens-barrel either directly or via a lens chamber. Therefore, the positive lens group G1 is guided in the optical axis direction as the first lens-barrel moves in the optical axis direction, while the other lens groups are guided in the optical axis direction along a zoom cam provided within the second lens-barrel.

In the two-stage barrel accommodating structure, the size of the main body of the camera can be effectively reduced when the length of the first lens-barrel in the optical axis direction, the length of the second lens-barrel in the optical axis direction and the length of the black box are substantially equal to each other. In this case, a ratio of moving amounts between the first lens-barrel and the second lens-barrel is about 2:1.

Thus, according to the present invention, it is preferable to have the ratio of the moving amount of the positive lens group G1 to that of the end lens group Ge from the wide-angle state to a given state be about 2:1 and substantially constant. This allows the positive lens group G1 and the end lens group Ge to be attached to the first and second lens-barrels, respectively. As a result, it is also possible to increase the zoom ratio without making the lens-barrel structure complicated.

The variable magnification optical system according to the initially described embodiments of the present invention includes a positive lens group G1 having positive refractive power which is disposed closest to an object and an end lens group Ge which is disposed closest to an image. The positive lens group G1 and the end lens group Ge move toward the object when the state of lens group positions is changed from the wide-angle state to the telephoto state.

In each embodiment, an aspherical surface is expressed by the following equation (a) in which the height in a vertical direction relative to the optical axis is y, displacement in the optical axis direction at the height y (sag amount) is S(y), a standard radius of curvature is R, the conical coefficient is κ and n-th order aspherical surface coefficient is $C_n$:

$$S(y) = (y^2/R)/\{1 + (1 - \kappa \cdot y^2/R^2)^{1/2}\} + \qquad (a)$$

$$C_2 \cdot y^2 + C_4 \cdot y^4 + C_6 \cdot y^6 + C_8 \cdot y^8 + C_{10} \cdot y^{10} + \ldots$$

In the respective embodiments, the aspherical surface is denoted by adding a mark "*" to the right side of the surface number.

Embodiment 1

FIG. 1 shows distribution of refractive power and change of the state of lens group positions from the wide-angle state to the telephoto state in a variable magnification optical system according to Embodiment 1 of the present invention.

As shown in FIG. 1, the variable magnification optical system includes a first lens group G1 having positive refractive power, a second lens group G2 having negative refractive power, a third lens group G3 having positive refractive power, a fourth lens group G4 having positive refractive power, a fifth lens group G5 having negative refractive power and a sixth lens group G6 having negative refractive power. The first to sixth lens groups are arranged in order from an object. The first lens group G1 and the sixth lens group G6 correspond to the positive lens group G1 and the end lens group Ge, respectively.

When the state of lens group positions is changed from the wide-angle state to the telephoto state, the respective lens groups move so that the space between the first lens group G1 and the second lens group G2 increases, the space between the second lens group G2 and the third lens group G3 decreases, the space between the third lens group G3 and the fourth lens group G4 increases, the space between the fourth lens group G4 and the fifth lens group G5 decreases, and the space between the fifth lens group G5 and the sixth lens group G6 increases.

In Embodiment 1, the space between the second lens group G2 and the fourth lens group G4 is always constant when the state of lens group positions is changed from the wide-angle state to the telephoto state. In addition, a ratio of the moving amount of the first lens group G1 to that of the sixth lens group G6 is always 2:1 when the state of lens group positions is changed from the wide-angle state to a given state.

Figure 2:
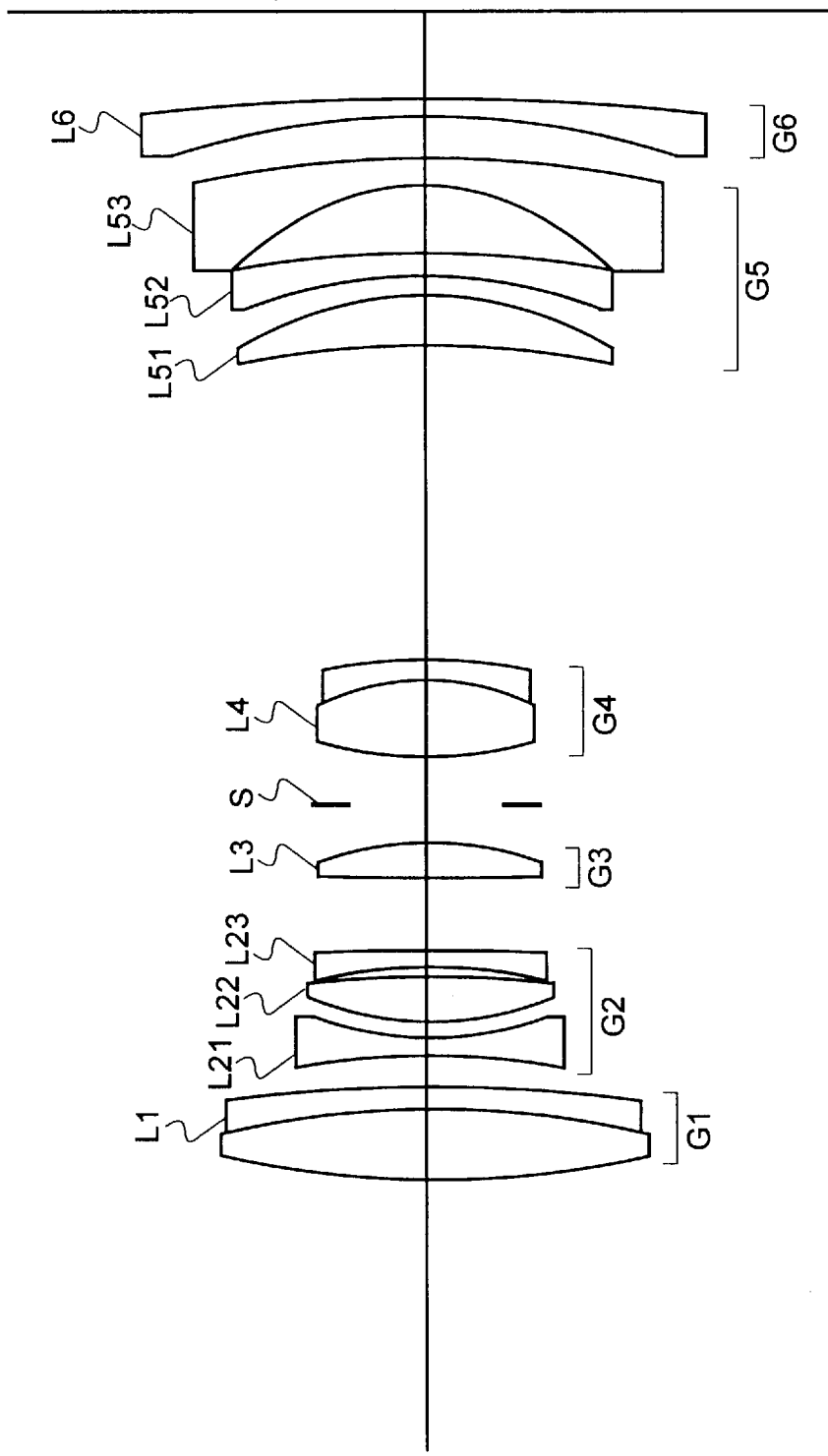
FIG. 2 is a view schematically showing the configuration of the variable magnification optical system according to the embodiment of the present invention shown in FIG. 1.

FIG. 2 illustrates the configuration of the variable magnification optical system according to Embodiment 1 of the present invention.

The first lens group G1 of the variable magnification optical system shown in FIG. 2 has a composite positive lens L1 composed of a double-convex lens and a negative meniscus lens with the concave surface thereof facing an object. The second lens group G2 is composed of a double-concave lens L21, a double-convex lens L22 and a negative meniscus lens L23 with the concave surface thereof facing the object. The third lens group G3 is composed of a double-convex lens L3. The fourth lens group G4 is a composite lens L4 composed of a double-convex lens and a negative meniscus lens with the concave surface thereof facing the object. The fifth lens group G5 is composed of a positive meniscus lens L51 with the concave surface thereof facing the object, a negative meniscus lens L52 with the concave surface thereof facing the object, and a negative meniscus lens L53 with the concave surface thereof facing the object. The sixth lens group G6 is composed of a negative meniscus lens L6 with the concave surface thereof facing the object. The lens groups G1 to G6 are arranged from the object in that order.

An aperture diaphragm S is disposed between the third lens group G3 and the fourth lens group G4 and moves integrally with the fourth lens group G4 when the state of lens group positions is changed from the wide-angle state to the telephoto state.

FIG. 2 illustrates the positional relationship among the respective lens groups in the wide-angle state. The lens groups G1 through G6 move on the optical axis along the respective orbits shown by arrows in FIG. 1 when the state of lens group positions is changed to the telephoto state.

Focusing of the optical system is conducted by moving the third lens group G3 along the optical axis.

Various values associated with Embodiment 1 are listed in Table (1). In Table (1), f denotes, in mm, the focal length, FNO denotes the f-number, 2ω denotes an angle of view, Bf denotes, in mm, the back focal length, and D0 denotes, in mm, a distance along the optical axis between an object and the surface of the optical system which is closest to the object. The surface number indicates the order of the lens surface along a direction which light rays travel from the object. In addition, values indicated as the refractive index and Abbe number are values for the d-line (λ=587.6 nm).

TABLE 1 f = 38.80 ~ 75.35 ~ 113.02 ~ 153.20
FNO = 4.30 ~ 6.88 ~ 8.99 ~ 11.01
2ω = 58.29 ~ 31.01 ~ 17.96 ~ 15.69°

| Surface number | Radius of curvature | Interval between the surfaces | Refractive index | Abbe number |
|---|---|---|---|---|
| 1 | 59.4129 | 4.2698 | 1.48749 | 70.45 |
| 2 | 37.9306 | 1.3814 | 1.84666 | 23.83 |
| 3 | −63.2599 | (D3 variable) | | |
| 4 | −30.9582 | 1.0047 | 1.83500 | 42.97 |
| 5 | 20.5865 | 1.0047 | | |
| 6 | 18.8731 | 2.6372 | 1.78472 | 25.70 |
| 7 | −47.1212 | 0.5023 | | |
| 8 | −20.6854 | 1.0047 | 1.83500 | 42.97 |
| 9 | −135.8101 | (D9 variable) | | |
| 10 | 323.8179 | 2.0093 | 1.48749 | 70.45 |
| 11 | −19.4306 | (D11 variable) | | |
| 12 | ∞ | 2.2605 | (Aperture diaphragm S) | |
| 13 | 27.6565 | 4.3953 | 1.48749 | 70.45 |
| 14 | −12.2958 | 1.2558 | 1.84666 | 23.83 |
| 15 | −22.8266 | (D15 variable) | | |
| 16 | −49.9703 | 3.0140 | 1.84666 | 23.83 |
| 17 | −20.6312 | 1.2583 | | |
| 18 | −26.6528 | 1.2583 | 1.78800 | 47.50 |
| 19 | −65.6297 | 3.9296 | | |
| 20 | −14.9671 | 1.5070 | 1.78800 | 47.50 |
| 21 | −64.1269 | (D21 variable) | | |
| 22 | −51.9711 | 1.0047 | 1.62041 | 60.35 |
| 23 | −157.2480 | (Bf) | | |

(Variable interval during zooming)

| f | 38.8039 | 75.3465 | 113.0189 | 153.2019 |
|---|---|---|---|---|
| D3 | 1.6326 | 11.9215 | 19.1983 | 26.2823 |
| D9 | 4.3754 | 2.8045 | 2.3398 | 1.8837 |
| D11 | 2.5316 | 4.1025 | 4.5672 | 5.0233 |
| D15 | 18.6826 | 9.6691 | 4.9215 | 1.8837 |
| D21 | 2.5116 | 12.6690 | 20.5388 | 28.2532 |
| Bf | 5.0227 | 16.4559 | 6.8561 | 36.2226 |

(Focusing moving amount of the third lens group G3 when the magnification is −1/30)

| Focal length f | 38.8039 | 75.3465 | 113.0189 | 153.2019 |
|---|---|---|---|---|
| D0 | 1117.0386 | 2182.0510 | 3276.2251 | 4447.4776 |
| Moving amount | 1.0769 | 0.8390 | 0.8086 | 0.7919 |

The sign of the moving amount is positive when the lens group moves from the object side to the image side.

(Values for the above conditions)

f1=83.0700 fe=−125.5812

TLt=130.8522

(1) $|\Delta Ge/\Delta G1|=0.55$ (Always constant)

(2) $f1/(fw\cdot ft)^{1/2}=1.077$

Bft/TLt=0.277

$fe/(fw\cdot ft)^{1/2}=1.629$

FIGS. 3 through 10 show various aberrations associated with Embodiment 1 for the d-line (λ=587.6 nm). FIG. 3 shows the various aberrations when the optical system is set in the maximum wide-angle state focused on an infinite object (i.e., an object located at infinity). FIG. 4 shows the various aberrations when the optical system is in the first intermediate state and is focused on the infinite object. FIG. 5 shows the various aberrations when the optical system in the second intermediate state and is focused on the infinite object. FIG. 6 shows the various aberrations when the optical system in the telephoto state (the state where the longest focal length is provided) and is focused on the infinite object.

FIG. 7 shows the various aberrations in the wide-angle state with a magnification of −1/30. FIG. 8 shows the various aberrations in the first intermediate state with the magnification of −1/30. FIG. 9 shows the various aberrations in the second intermediate state with the magnification of −1/30. FIG. 10 shows the various aberrations in the telephoto state with the magnification of −1/30.

In the respective diagrams, FNO denotes the F-number, NA denotes a numeric aperture, Y denotes, in mm, an image height, A denotes, in degrees, a half angle of view for the respective image height, and H denotes, in mm, an object height for the respective image height.

In the diagrams showing astigmatism, a solid line indicates a sagital image plane and a broken line indicates a meridional image plane. In the diagrams showing spherical aberration, a broken line indicates the sine condition.

As is apparent from the respective diagrams showing the various aberrations, excellent compensation is made for the various aberrations at the respective imaging distances and at the respective focal lengths.

Figure 11A:
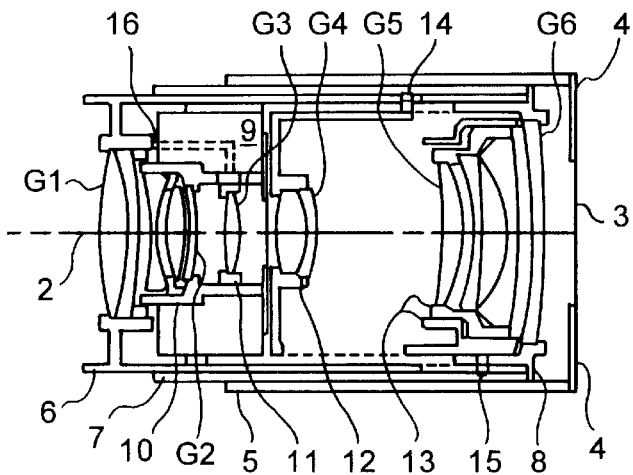
Figure 11B:
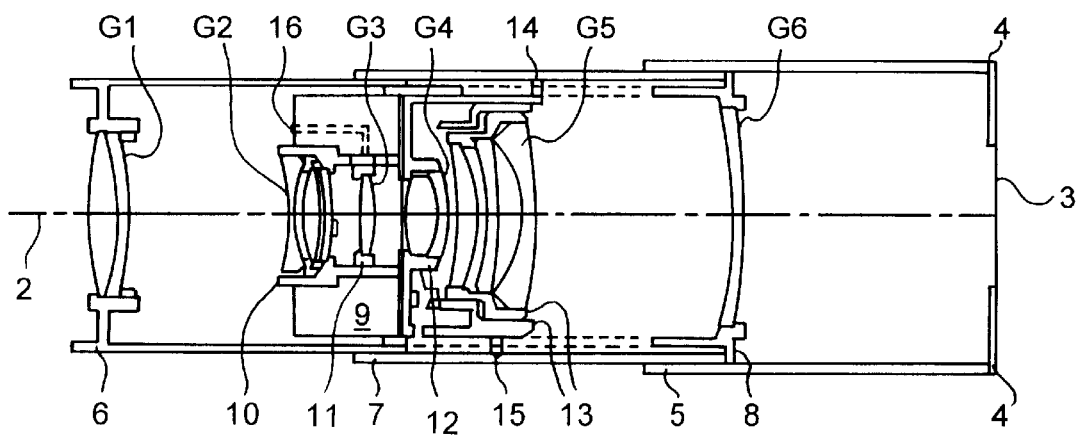

FIGS. 11A and 11B show cross sections of a lens-barrel incorporating the variable magnification (zooming) optical system according to Embodiment 1. FIG. 11A shows the lens-barrel in its wide-angle state and FIG. 11B shows the lens-barrel in its telephoto state.

The lens-barrel of FIGS. 11A and 11B includes a first lens-barrel 6, a second lens-barrel 7, a black box 5 for attaching the variable magnification optical system to a main body of a camera, and a driving motor (not shown) for rotationally driving the second lens-barrel 7. The first lens-barrel 6 and the second lens-barrel 7 are tightly fitted to each other with helicoids, and the second lens-barrel 7 and the black box 5 are tightly fitted to each other with helicoids. The second lens-barrel 7 is sent out along the optical axis 2 of the variable magnification optical system while being rotated in accordance with the rotation of the motor. The rotation force of the second lens-barrel 7 is transmitted to the first lens-barrel 6 and, therefore, the first lens-barrel 6 moves straight in the optical axis direction in accordance with the rotation of the second lens-barrel 7. A straightforward barrel 8 is attached to the second lens-barrel 7. Thus, the straightforward barrel 8 travels integrally with the second lens-barrel 7 when the second lens-barrel 7 moves in the optical axis direction. The straightforward barrel 8 goes straight without being rotated because of a straightforward groove provided in the black box 5.

The first lens group G1, which constitutes an imaging lens system, is attached to the first lens-barrel 6 and moves in the optical axis direction in accordance with the movement of the first lens-barrel 6. The second lens group G2 is supported in the first lens chamber 10. The third lens group G3 is supported in the second lens chamber 11. The fourth lens group G4 is supported in the third lens chamber 12. The fifth lens group G5 is supported in the fourth lens chamber 13. The sixth lens group G6 is attached to the straightforward barrel 8. The first lens chamber 10 and the second lens chamber 11 are tightly fitted to each other with helicoids. The first lens chamber 10 and the third lens chamber 13 are attached to the front side and the back side of a shutter unit 9, respectively. Guide pins 14 and 15 are provided on the outer peripheries of the third lens chamber 12 and the fourth lens chamber 13. The guide pins 14 and 15 reach a zoom cam provided in the second lens-barrel 7 via the straightforward groove provided within the barrel 8. Thus, the third lens chamber 12 and the fourth lens chamber 13 are supported by the zoom cam provided in the second lens-barrel 7 via the guide pins 14 and 15.

The second lens group G2 to the fifth lens group G5 move relative to the second lens-barrel 7 in accordance with the zoom cam during a magnification change. The lens groups G2 to G5 move straight in the optical axis direction without being rotated because the rotation thereof is suppressed by the straightforward grooves. On the other hand, the first lens group G1 and the sixth lens group G6 move in the optical axis direction integrally with the first lens-barrel 6 and the straightforward barrel 8, respectively.

During the magnification change and the focusing operation, the third lens group G3 is driven by the action of a rotation lever 16 provided in the shutter unit 9 so as to move relative to the shutter unit 9 along with the helicoid.

In FIG. 11, the reference numerals 4 and 3 denote an aperture for a film and a film face, respectively.

Embodiment 2

Figure 12:
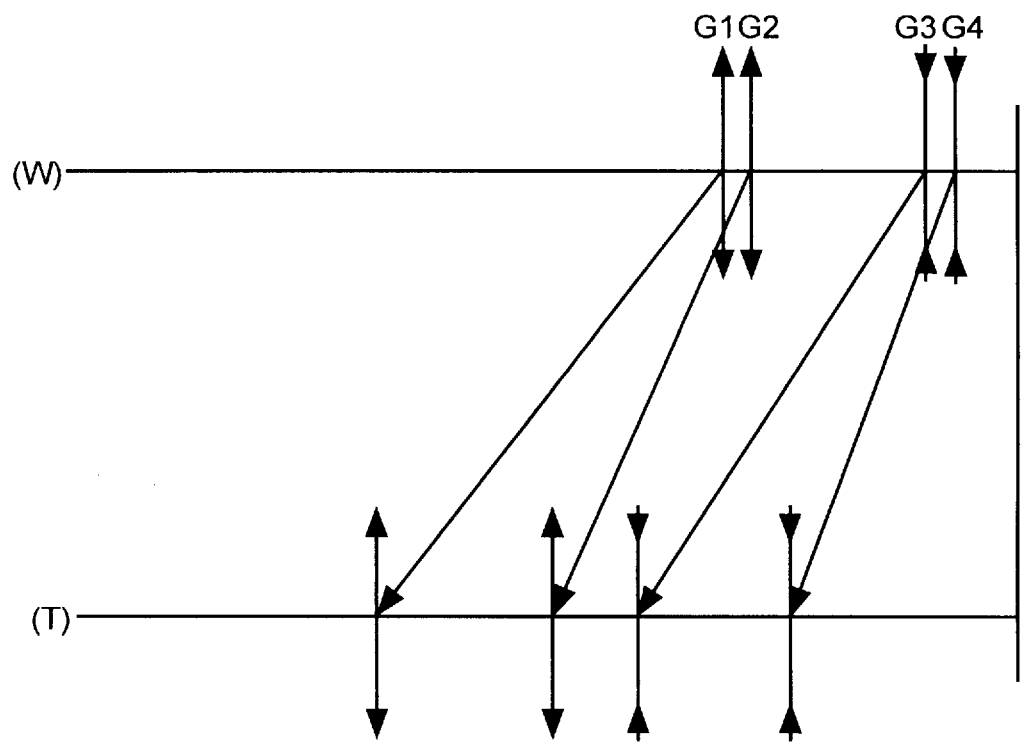
FIG. 12 is a diagram showing a distribution of refractive power in a variable magnification optical system according to another embodiment of the present invention and represents a change in state of lens group positions from the wide-angle state (W) to the telephoto state (T).

FIG. 12 shows distribution of refractive power and change of the state of lens group positions from the wide-angle state to the telephoto state in a variable magnification optical system according to Embodiment 2 of the present invention.

As shown in FIG. 12, the variable magnification optical system includes a first lens group G1 having positive refractive power, a second lens group G2 having positive refractive power, a third lens group G3 having negative refractive power, and a fourth lens group G4 having negative refractive power. The lens groups G1–G4 are arranged from an object in this order. The first lens group G1 corresponds to the positive lens group G1 and the fourth lens group G4 corresponds to the end lens group Ge.

When the state of lens group positions is changed from the wide-angle state to the telephoto state, the respective lens groups move so that the space between the first lens group G1 and the second lens group G2 increases, the space between the second lens group G2 and the third lens group G3 decreases, and the space between the third lens group G3 and the fourth lens group G4 increases.

In Embodiment 2, a ratio of the moving amount of the first lens group G1 to that of the fourth lens group G4 when the state of lens group positions is changed from the wide-angle state to a given state is always 2:1.

FIG. 13 illustrates the configuration of the variable magnification optical system according to Embodiment 2 of the present invention.

The first lens group G1 of the variable magnification optical system of FIG. 13 is a composite positive lens L1 composed of a double-convex lens and a negative meniscus lens with the concave surface thereof facing an object. The second lens group G2 is composed of a composite lens L21, of a double-concave lens and a double-convex lens, and a double-convex lens L22. The third lens group G3 is composed of a positive meniscus lens L31 with the concave surface thereof facing the object and a negative meniscus lens L32 with the concave surface thereof facing the object. The fourth lens group G4 is composed of a negative meniscus lens L4 with the concave surface facing the object.

An aperture diaphragm S is disposed between the second lens group G2 and the third lens group G3 and moves integrally with the second lens group G2 when the state of lens group positions is changed from the wide-angle state to the telephoto state.

FIG. 13 illustrates the positional relationship among the respective lens groups in the wide-angle state. The lens groups G1 through G4 move on the optical axis along the respective orbits shown by arrows in FIG. 12 when the state of lens group positions is changed to the telephoto state.

Focusing is conducted by moving the second lens group G2 along the optical axis.

Various values associated with Embodiment 2 are listed in Table (2). In Table (2), f denotes, in mm, the focal length, FNO denotes the f-number, 2ω denotes an angle of view, Bf denotes, in mm, the back focal length, and Do denotes, in mm, a distance along the optical axis between an object and the surface of the optical system which is closest to the object. The surface number indicates the order of the lens surface along a direction in which light rays travel from the object. In addition, values indicated as the refractive index and Abbe number are values for the d-line (λ=587.6 nm).

TABLE 2 f = 38.80 ~ 62.79 ~ 110.50
FNO = 4.07 ~ 6.00 ~ 9.50
2ω = 56.57 ~ 36.54 ~ 21.65°

| Surface number | Radius of curvature | Interval between the surfaces | Refractive index | Abbe constant |
| --- | --- | --- | --- | --- |
| 1 | 41.6230 | 4.3953 | 1.48749 | 70.45 |
| 2 | −69.0932 | 1.5070 | 1.84666 | 23.83 |
| 3 | −136.2375 | (D3 variable) | | |
| 4* | −19.4865 | 1.2558 | 1.77250 | 49.61 |
| 5 | 67.5145 | 2.5116 | 1.53172 | 48.83 |
| 6 | −60.4669 | 3.1395 | | |
| 7 | 27.6463 | 5.0233 | 1.83500 | 42.97 |
| 8* | −14.3801 | 1.8837 | | |
| 9 | ∞ | (D9 variable) | (Aperture diaphragm S) | |
| 10* | −81.7577 | 3.2651 | 1.58518 | 30.24 |
| 11 | −43.0504 | 5.4730 | | |
| 12 | −11.8920 | 1.5070 | 1.77250 | 49.61 |
| 13 | −47.8351 | (D13 variable) | | |
| 14 | −155.8237 | 1.2558 | 1.62041 | 60.35 |
| 15 | −10000.0000 | | (Bf) | |

TABLE 2-continued (Data for the aspherical surfaces)
Surface number 4

| κ | $C_2$ | $C_4$ |
|---|---|---|
| 1.000 | 0.000 | $-2.3284 * 10^{-5}$ |
| $C_6$ | $C_8$ | $C_{10}$ |
| $-1.2577 * 10^{-7}$ | $-2.3789 * 10^{-10}$ | $1.3228 * 10^{-11}$ |

Surface number 8

| κ | $C_2$ | $C_4$ |
|---|---|---|
| 1.000 | 0.000 | $5.7157 * 10^{-5}$ |
| $C_6$ | $C_8$ | $C_{10}$ |
| $5.6192 * 10^{-7}$ | $-8.9851 * 10^{-9}$ | $4.4291 * 10^{-11}$ |

Surface number 10

| κ | $C_2$ | $C_4$ |
|---|---|---|
| 1.000 | 0.000 | $4.8605 * 10^{-5}$ |
| $C_6$ | $C_8$ | $C_{10}$ |
| 1.3267 | $2.2118 * 10^{-10}$ | $9.3828 * 10^{-12}$ |

(Variable interval during zooming)

| f | 38.8030 | 62.7872 | 110.5025 |
|---|---|---|---|
| D3 | 2.6701 | 8.6645 | 14.7356 |
| D9 | 14.0396 | 7.2512 | 1.7946 |
| D13 | 0.6279 | 9.0954 | 23.3046 |
| Bf | 6.2782 | 13.9511 | 28.7785 |

(Focusing moving amount of the second lens group G2 when the magnification is −1/40)

| Focal length f | 38.8030 | 62.7872 | 110.5025 |
|---|---|---|---|
| D0 | 1554.2933 | 2506.5670 | 4406.4031 |
| Moving amount | 0.5913 | 0.4264 | 0.2875 |

The sign of the moving amount is positive when the lens group moves from the object side toward the image side.

(Values for the above conditions)

f1=79.5995
fe=−251.1624
TLt=99.8305

(1) |ΔGe/ΔG1|=0.5 (Always constant)
(2) f1/(fw·ft)$^{1/2}$=1.216
(3) Bft/TLt=0.288
(4) fe/(fw·ft)$^{1/2}$=3.836

FIGS. 14 through 19 show various aberrations for the d-line (λ=587.6 nm) associated with Embodiment 2. FIG. 14 shows the various aberrations when the optical system is set in the maximum wide-angle state focused on an infinite object. FIG. 15 shows the various aberrations when the optical system is in the intermediate lens group arrangement and is focused on the infinite object. FIG. 16 shows the various aberrations when the optical system in the telephoto state and is focused on the infinite object.

FIG. 17 shows the various aberrations in the wide-angle state with a magnification of −1/40. FIG. 18 shows the various aberrations in the intermediate state with a magnification of −1/40. FIG. 19 shows the various aberrations in the telephoto state with a magnification of −1/40.

In the respective diagrams, FNO denotes the F-number, NA denotes the numeric aperture, Y denotes, in mm, an image height, A denotes, in degrees, a half angle of view for the respective image height, and H denotes, in mm an object height for the respective image height.

In the diagrams showing astigmatism, a solid line indicates a sagital image plane and a broken line indicates a meridional image plane. In the diagrams showing spherical aberration, a broken line indicates the sine condition.

As is apparent from the respective diagrams showing the various aberrations, excellent compensation is made for the various aberrations at the respective imaging distances and at the respective focal lengths.

Figure 20A:
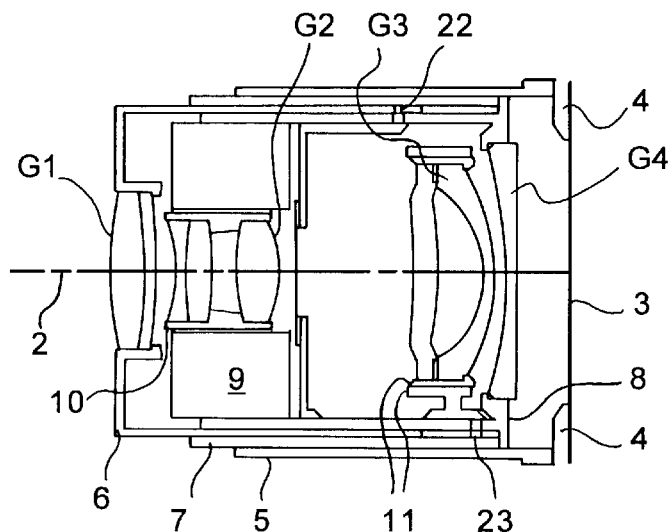
Figure 20B:
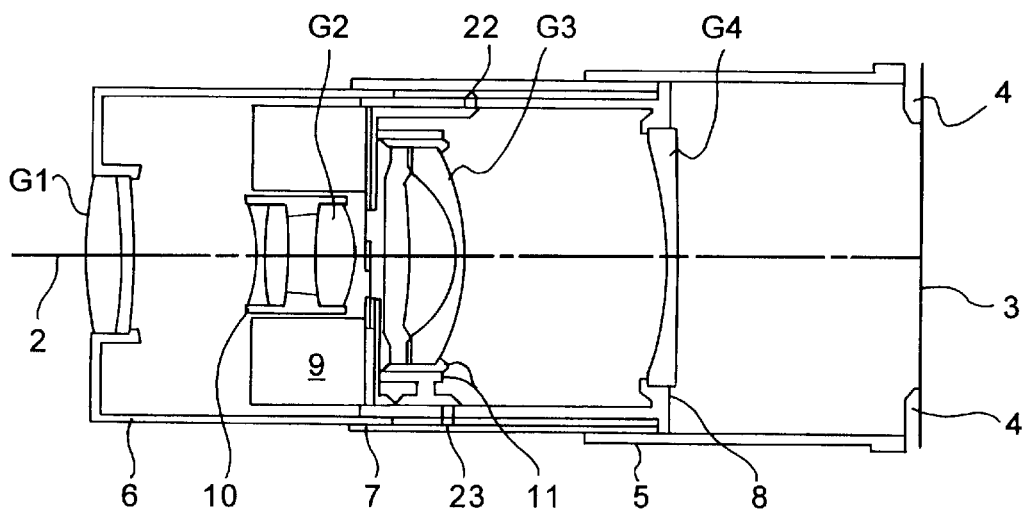

FIGS. 20A and 20B show cross sections of a lens-barrel incorporating the variable magnification (zooming) optical system according to Embodiment 2. FIG. 20A shows the lens-barrel in its wide-angle state and FIG. 20B shows the lens-barrel in its telephoto state.

The lens-barrel of FIGS. 20A and 20B includes a first lens-barrel 6, a second lens-barrel 7, a black box 5 for attaching the variable magnification optical system to a main body of a camera, and a driving motor (not shown) for rotationally driving the second lens-barrel 7. The first lens-barrel 6 and the second lens-barrel 7 are tightly fitted to each other with helicoids, and the second lens-barrel 7 and the black box 5 are tightly fitted to each other with helicoids. The second lens-barrel 7 is sent out along the optical axis 2 of the variable magnification optical system while being rotated in accordance with the rotation of the motor. The rotation force of the second lens-barrel 7 is transmitted to the first lens-barrel 6 and, therefore, the first lens-barrel 6 moves straight in the optical axis direction in accordance with the rotation of the second lens-barrel 7. A straightforward barrel 8 is attached to the second lens-barrel 7. Thus, the straightforward barrel 8 is sent out integrally with the second lens-barrel 7 when the second lens-barrel 7 moves in the optical axis direction. The straightforward barrel 8 goes straight without being rotated because of a straightforward groove provided in the black box 5.

The first lens group G1, which constitutes an imaging lens system, is attached to the first lens-barrel 6 and moves in the optical axis direction in accordance with the movement of the first lens-barrel 6. The second lens group G2 is supported in the first lens chamber 10. The third lens group G3 is supported in the second lens chamber 11. The fourth lens group G4 is attached to the barrel 8.

Guide pins 22 and 23 are provided on the outer peripheries of the first lens chamber 10 and the second lens chamber 11, respectively. The guide pins 22 and 23 reach a zoom cam provided in the second lens-barrel 7 via a straightforward groove provided within the straightforward barrel 8. Thus, the first lens chamber 10 and the second lens chamber 11 are supported by the zoom cam provided in the second lens-barrel 7 via the guide pins 22 and 23.

The second lens group G2 and the third lens group G3 move relative to the second lens-barrel 7 in accordance with the zoom cam during a magnification change. The lens groups G2 and G3 move straight in the optical axis direction without being rotated because the rotation thereof is suppressed by the straightforward grooves. On the other hand, the first lens group G1 and the fourth lens group G4 move in the optical axis direction integrally with the first lens-barrel 6 and the straightforward barrel 8, respectively.

During the magnification change and the focusing operation, the second lens group G2 is driven by the action of a rotation lever provided in a shutter unit 9 so as to move relative to the shutter unit 9 along with the helicoid.

In FIG. 20, the reference numerals 4 and 3 denote an aperture for a film and a film surface, respectively.

The variable magnification optical system according to the present invention is not limited to a zoom lens such as that mentioned. The optical system can, for example, be applied to a varifocal zoom lens in which the focal lengths do not exist continuously.

According to the embodiments of the present invention described, a variable magnification optical system which is capable of reducing the size and increasing a zoom ratio is realized.

To assist in an understanding of embodiments which will now be described, a conventional lens-barrel structure for the multi-group zoom lens will now be discussed.

It is known that, when the state of the lens group positions is changed from the wide-angle state to the telephoto state, control of the lens group positions is conducted by a cam mechanism which converts a rotational driving force of a motor to a driving force in an optical axis direction.

The cam mechanism is composed of a cam tube having cam grooves and a straightforward barrel having straightforward grooves. Guide pins provided on the outer periphery of a lens chamber for supporting the lens groups are engaged with the cam grooves via the straightforward grooves. In general, the guide pins are provided at three portions of the outer periphery of the lens chamber. Also, each of the straightforward grooves and the cam grooves are provided at three positions corresponding to the positions of the guide pins. The shape of the cam grooves is nonlinear. When the lens-barrel rotates due to the action of the motor, the lens chamber is prevented from rotating due to the cam grooves, and moves in the optical axis direction along the cam grooves.

Figure 33:
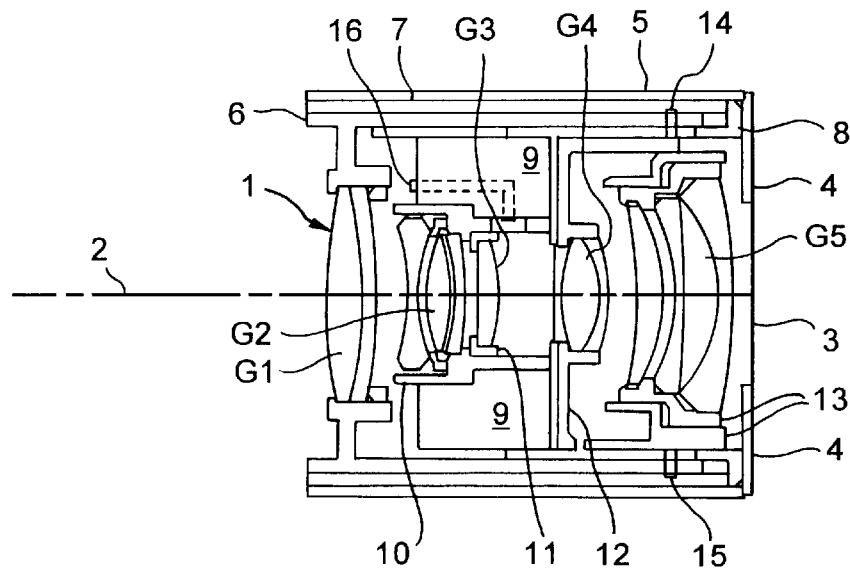
FIG. 33 is a cross-sectional view illustrating a conventional lens-barrel having a two-state barrel accommodating structure for a five-group zoom lens including, in order, a positive lens group, a negative lens group, a positive lens group, a positive lens group and a negative lens group.
Figure 34:
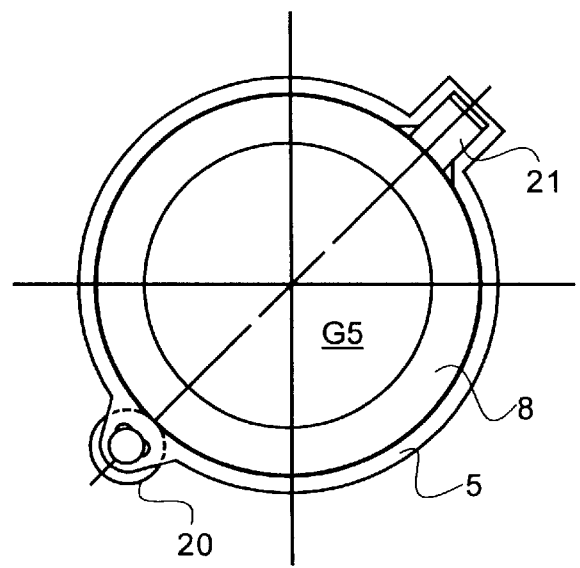
FIG. 34 is a view of the zoom lens and the lens-barrel shown in FIG. 33 as seen from the image-side thereof (the right-side in FIG. 33) along the optical axis.

FIG. 33 is a cross-sectional view showing the configuration of the conventional lens-barrel having the two-stage barrel accommodating structure for the conventional five-group zoom lens composed of a positive lens group, a negative lens group, a positive lens group, a positive lens group and a negative lens group. FIG. 34 is a view of the zoom lens and the lens-barrel of FIG. 33 seen from the image-side (the right-side in FIG. 33) thereof along the optical axis. FIG. 33 illustrates an accommodated state in which the zoom lens is accommodated within the main body of the camera.

In FIG. 33, the zoom lens 1 is composed of a first lens group G1 having a positive refractive power, a second lens group G2 having a negative refractive power, a third lens group G3 having a positive refractive power, a fourth lens group G4 having a positive refractive power, and a fifth lens group G5 having a negative refractive power. The lens groups G1–G5 are arranged in order from the object. An aperture diaphragm 4 and a film face 3 are provided on the image-side of the fifth lens group G5.

The first lens group G1 is attached to the first lens barrel 6 and moves integrally therewith. The second lens group G2, the third lens group G3 and the fourth lens group G4 are supported by the first lens chamber 10, the second lens chamber 11 and the third lens chamber 12, respectively. The second lens chamber 11 and the first lens chamber 10 are tightly fitted to each other with helicoids. The first lens chamber 10 and the third lens chamber 12 are attached on the front side and the back side, respectively, of a shutter unit 9.

A guide pin 14 is formed on the outer periphery of the third lens chamber 12 which supports the fourth lens group G4, while a guide pin 15 is formed on the outer periphery of the fourth lens chamber 13 which supports the fifth lens group G5. The guide pins 14 and 15 are respectively engaged with cam grooves formed on the inner wall of the second lens-barrel 7 via straightforward grooves of the straightforward barrel 8.

The lens-barrel includes the first lens-barrel 6 and the second lens-barrel 7 tightly fitted to each other with helicoids. The helicoids are formed on the outer wall of the first lens-barrel 6 and the inner wall of the second lens-barrel 7 so that the helicoids are engaged with each other. On the outer periphery of the second lens-barrel 7, a gear and a helicoid are provided. The gear of the second lens-barrel 7 is engaged with a gear supported in a black box 5. The helicoid of the second lens-barrel 7 is engaged with a helicoid provided on the inner wall of the black box 5. The black box 5 has a function of attaching the zoom lens to the main body of the camera.

When a rotation driving force generated by a driving motor (not shown) is transmitted to a gear 20 via a plurality of gears (not shown), the gear 20 rotates, so that the second lens-barrel 7 which is engaged with the gear 20 is sent out along the optical axis 2 while rotating along the helicoid.

When the second lens-barrel 7 rotates, the first lens-barrel 6 is sent out along the optical axis 2 while rotating relative to the second lens-barrel 7 along the helicoid formed on the inner wall of the second lens-barrel 7. The helicoidal angle of the first lens-barrel 6 and the second lens-barrel 7 and the helicoidal angle of the second lens-barrel 7 and the black box 5 are determined so that the first lens-barrel 6 moves straight with respect to the black box 5 (i.e., moves along the optical axis 2). The movement of the first lens-barrel 6 along the optical axis 2 allows the first lens group G1 to move in the optical axis direction integrally with the first lens-barrel 6. The straightforward barrel 8 is attached to the second lens-barrel 7. The rotation of the straightforward barrel 8 is suppressed by a rotation stopper 21 in the black box 5. Accordingly, the second lens-barrel 7 moves along the optical axis 2 while rotating, and the straightforward barrel 8 moves along the optical axis 2 integrally with the second lens-barrel 7 without rotating.

Figure 37:
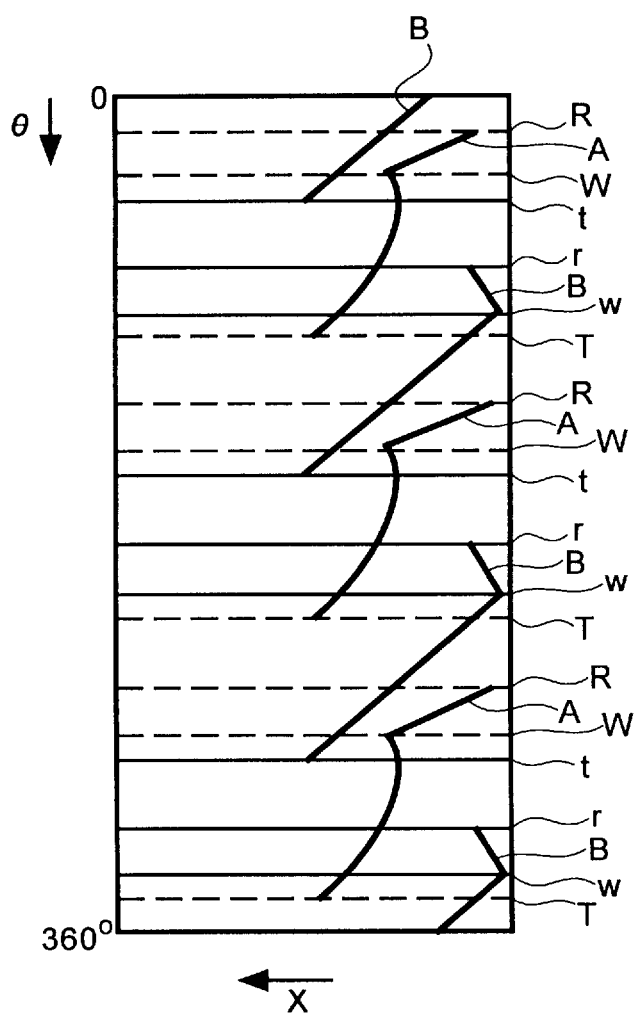
FIG. 37 is a view showing the shape of zoom cams (cam grooves) formed within the second lens-barrel of FIG. 33.

FIG. 37 illustrates the shape of the zoom cams (the cam grooves) formed in the second lens-barrel 7 shown in FIG. 33.

In FIG. 37, the direction X indicates a direction along the optical axis 2 and the direction θ indicates a direction of rotation. Reference sign A denotes the zoom cam for guiding the fourth lens group G4 by the guide pin 14 and, therefore, guiding the second lens group G2 to the fourth lens group G4. Reference sign B denotes the zoom cam for guiding the fifth lens group G5 by the guide pin 15. In FIG. 37, reference signs R and r, respectively, denote the cam positions of the fourth lens group G4 and the fifth lens group G5 in the accommodated state. In addition, reference signs W and w, respectively, denote the cam positions of the fourth lens group G4 and the fifth lens group G5 in the wide-angle state, respectively, and reference signs T and t denote these groups in the telephoto state.

The straightforward grooves for guiding the guide pins 14 and 15 along the optical axis 2 are provided to the straightforward barrel 8. The zoom cams A and B, which receive and hold the guide pins 14 and 15, are provided on the inner wall of the second lens-barrel 7, as shown in FIG. 37. Thus, when the second lens-barrel 7 moves in the optical axis direction while rotating as a result of the rotation driving force of the driving motor, the rotation of the second lens group G2 through the fourth lens group G4 is suppressed because of the straightforward grooves. The second lens group G2 through the fourth lens group G4 move straight in the optical axis direction along the zoom cam A.

During focusing, the third lens group G3 is rotationally driven by a rotation lever 16 provided in the shutter unit 9 so as to move relative to the shutter unit 9 along the helicoids.

Figure 35:
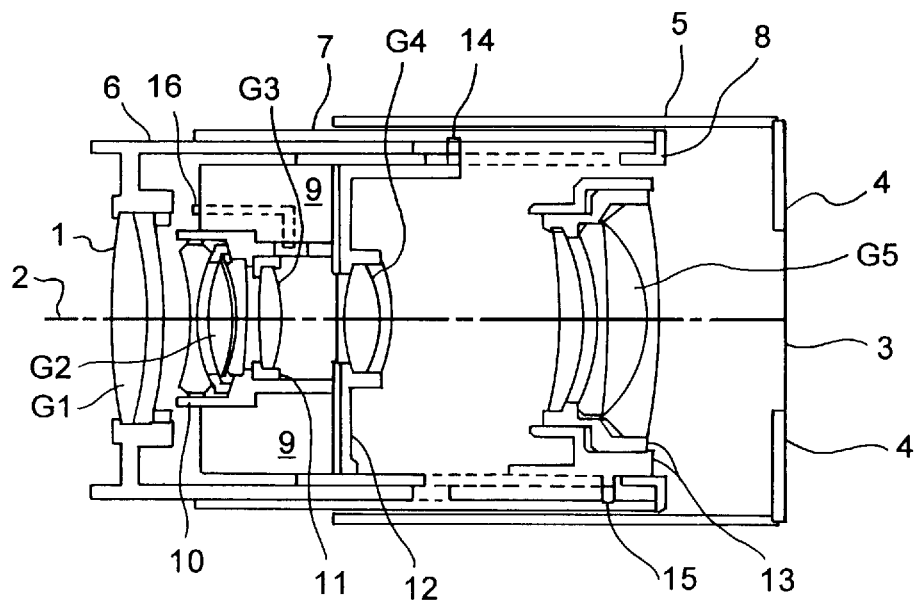
FIG. 35 is a cross-sectional view similar to FIG. 33 and illustrates the zoom lens and the lens-barrel in the wide-angle state.
Figure 36:
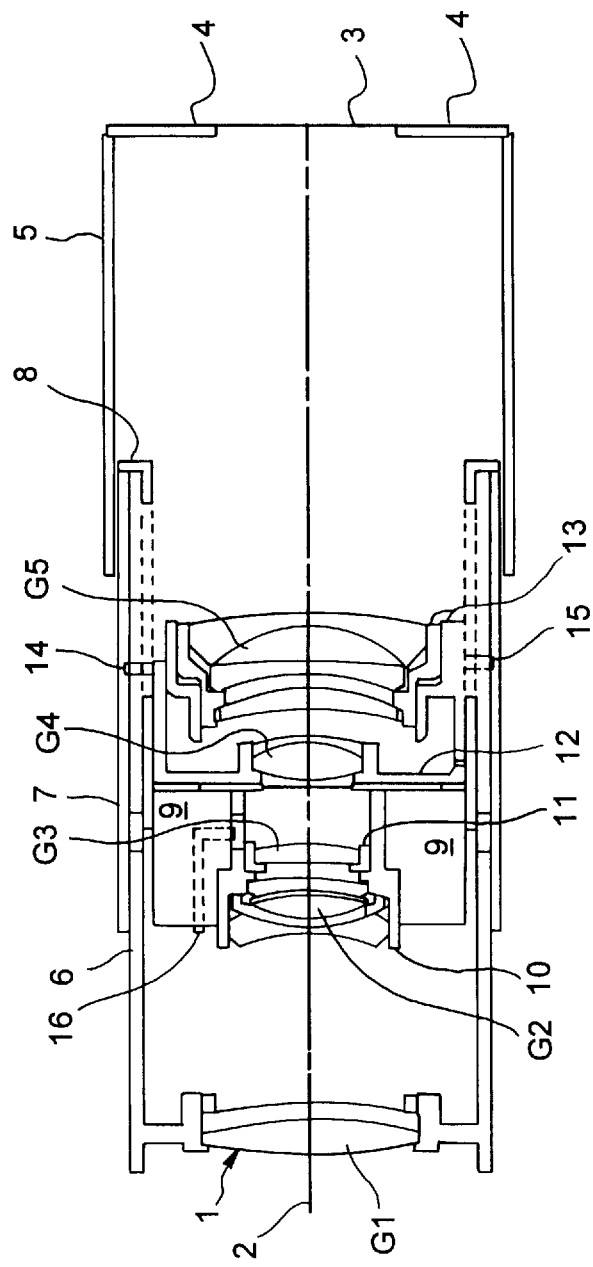
FIG. 36 is a cross-sectional view similar to FIG. 33 and illustrates the zoom lens and the lens-barrel in the telephoto state.

FIG. 35, which is similar to FIG. 33, is a cross-sectional view of the zoom lens and the lens-barrel in a wide-angle state. FIG. 36, which is similar to FIG. 33, is a cross-sectional view of the zoom lens and the lens-barrel in a telephoto state.

As shown in FIGS. 33–36, in order to make the main body of the camera thinner, it is necessary to reduce the thickness of the lens-barrel (the thickness along the optical axis 2) in the accommodated state. In this case, the thickness of the lens-barrel can be suppressed to a minimum thickness by making the length of the black box 5 in the optical axis direction, the length of the first lens-barrel 6 in the optical axis direction and the length of the second lens-barrel 7 in the optical axis direction substantially equal to one another.

Assuming that the connection length of the black box 5 and the second lens-barrel 7 is substantially the same as the connection length of the first lens-barrel 6 and the second lens-barrel 7 in the telephoto state, a ratio of the moving amount of the first lens-barrel 6 to that of the second lens-barrel 7 is approximately 2:1 when the state of the lens group positions is changed from the wide-angle state to the telephoto state. In other words, the ratio of the moving amount of the first lens-barrel 6 to that of the second lens-barrel 7 is always constant.

However, as shown in FIG. 37, three zoom cams A and three zoom cams B are provided in order to secure the accuracy of the lens group positions. Therefore, if the number of the zoom cams is increased in order to increase the zoom ratio, the space between adjacent zoom cams becomes narrower and the accuracy of the lens group positions cannot be maintained. As a result, a desired optical performance cannot be obtained.

Among the components of the conventional zoom lens-barrel, attention is paid to the moving member (the straight-forward barrel), which moves by a moving amount different from the moving amounts of the lens groups included in the variable magnification optical system when the state of the lens group positions is changed from the wide-angle state to the telephoto state. Thus, according to the present invention, the lens groups are attached to the moving member, thereby allowing the number of movable lens groups to be increased without making the lens-barrel structure complicated.

By employing a variable magnification optical system which satisfies the following conditions 4 to 6, a zoom ratio can be increased while the changes in lateral magnification of the respective lens groups are suppressed when the state of the lens group positions is changed.

4. When the respective lens groups move from the wide-angle state to the telephoto state, the first lens group G1 which is disposed closest to the object and the end lens group Ge which is disposed closest to the image are made to move in the same direction. The moving amount ratio of the first lens group G1 to the end lens group Ge is set to be approximately 2:1 from the wide-angle state to a given state of the lens group positions.

5. The refractive power of the first lens group G1 is set to be positive. When the state of the lens group positions is changed from the wide-angle state to the telephoto state, the first lens group G1 is made to move toward the object.

6. The refractive power of the end lens group Ge is set to be negative.

In the lens-barrel for the zoom lens having the two-stage barrel accommodating structure, the moving amount ratio of the first lens-barrel to the second lens-barrel is approximately 2:1.

According to the present invention, in the lens-barrel having the two-stage barrel accommodating structure, the first lens-barrel and the second lens-barrel are put away in the main body of the camera so that one overlaps the other in the accommodated state. The first lens group G1, which moves integrally with the first lens-barrel, is disposed closest to the object in the first lens-barrel. The end lens group Ge, which moves integrally with the second lens-barrel, is disposed closest to the image in the second lens-barrel. Moreover, orbits for the respective lens groups are determined so that excellent optical performance is obtained when the moving amount ratio of the first lens group G1 to the end lens group Ge from the wide-angel state to a given state of the lens group positions is equal to the moving amount ratio of the first lens-barrel to the second lens-barrel, thereby simplifying the lens-barrel structure. For this reason, the above condition 4 is necessary.

In order to simplify the lens-barrel structure, it is important to shorten the total lens length in the telephoto state. According to the present invention, the total lens length in the telephoto state can be shortened by designing the first lens group G1 to have the positive refractive power. In the wide-angle state, off-axis lens flux passing through the first lens group G1 is made closer to the optical axis by shortening the total lens length, thereby reducing the diameter of the lens.

Furthermore, a telephoto type arrangement of the refractive power is desirable for shortening the total lens length in the telephoto state. Therefore, the first lens group G1 is designed to have a positive refractive power and the end lens group Ge is designed to have a negative refractive power. This shortens the total lens length effectively. For this reason, the above conditions 5 and 6 are necessary.

When the lens groups move along the optical axis direction by very slight amounts, the position of the image face moves by an amount which is proportional to the square of the lateral magnification. In a three-group zoom lens including a positive lens group, a positive lens group and a negative lens group, for example, when the zoom ratio increases, the lateral magnification of the negative lens group in the telephoto state becomes extremely large and the control of the lens group positions requires higher accuracy.

According to the present invention, the end lens group Ge is designed to have a negative refractive power and is made to move toward the object when the state of the lens group positions is changed from the wide-angle state to the telephoto state. This increases the lateral magnification of the end lens group Ge in the telephoto state and decreases the lateral magnification of the negative lens group Gn in the telephoto state, thereby reducing the accuracy requirement for control of the lens group positions.

According to the present invention, in order to reduce the accuracy requirement for positional control of the negative lens group Gn in the telephoto state, it is desirable to satisfy condition (5):

$$0.03 < fn/fe < 0.40 \qquad (5)$$

Here, fn is the focal length of the negative lens group Gn; and fe is the focal length of the end lens group Ge.

When fn/fe exceeds the upper limit of condition (5), the refractive power of the end lens group Ge is too strong and, therefore, it becomes difficult to construct the end lens group Ge using a small number of lenses and simplify the structure.

If, however, fn/fe falls below the lower limit of condition (5), then the refractive power of the end lens group Ge is too weak. This prevents a reduction in the necessary accuracy of the positional control of the negative lens group Gn.

Moreover, according to the present invention, it is important to shorten the total lens length in order to reduce the size of the lens-barrel. Therefore, it is desirable to satisfy condition (6):

$$0.8 < f1/(fw \cdot ft)^{1/2} < 1.4 \quad (6)$$

where f1 is the focal length of the first lens group G1;

fw is the focal length of the variable magnification optical system in the wide-angle state; and ft is the focal length of the variable magnification optical system in the telephoto state.

When $f1/(fw \cdot ft)^{1/2}$ exceeds the upper limit of condition (6), the converging effect by the first lens group G1 becomes strong. As a result, in the wide-angle state, the off-axis light flux passing through the first lens group G1 is displaced from the optical axis. As a result, the lens diameter becomes larger.

If, however, $f1/(fw \cdot ft)^{1/2}$ falls below the lower limit of condition (6), then the total lens length becomes larger.

In the conventional multi-group zoom lens, the negative lens group is made to move toward the object when the state of the lens group positions is changed from the wide-angle state to the telephoto state. Therefore, a change in the total lens length associated with the change of the state of lens group positions is large. As a result, the center of gravity is too far apart from the position of the image face, resulting in some inconveniences such as fall down of the lens-barrel.

On the other hand, according to the present invention, the end lens group Ge, which moves integrally with the second lens-barrel is disposed on the image-side of the negative lens group Gn. This allows space between the negative lens group Gn and the end lens group Ge when the state of the lens group positions is changed from the wide-angle state to the telephoto state. Therefore, the center of gravity can be made closer to the position of the image face and the whole lens-barrel can be prevented from falling down.

According to the present invention, it is desirable to satisfy condition (7) in order to suppress toppling the lens-barrel:

$$Bft/TLt < 0.5 \quad (7)$$

Here, TLt is the total lens length of the variable magnification optical system in the telephoto state; and Bft is the back focal length of the variable magnification optical system in the telephoto state.

When Bft/TLt exceeds the upper limit of condition (7), the lens-barrel tends to fall down. The term "total lens length of the variable magnification optical system" refers to a distance from a face located closest to the object to a face located closest to the image.

Embodiment 3

Figure 21:
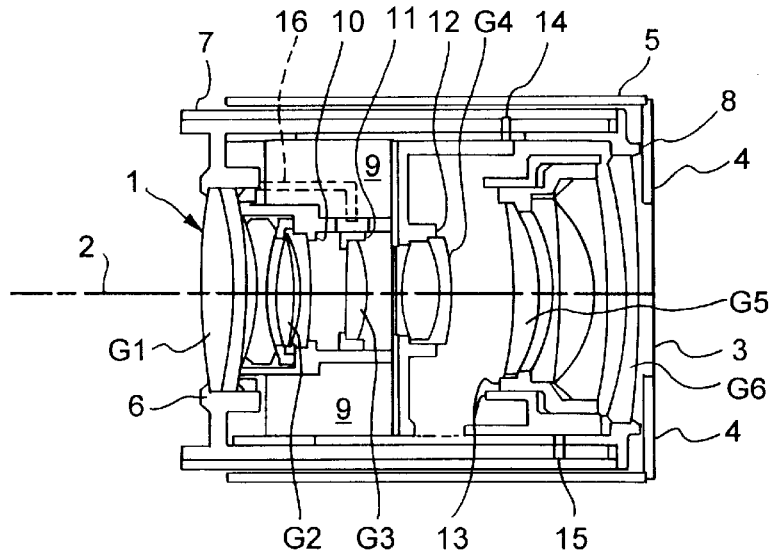
FIG. 21 is a cross-sectional view illustrating the configuration of the lens-barrel having a two-stage accommodating structure in a variable magnification optical system according to an embodiment of the present invention.
Figure 22:
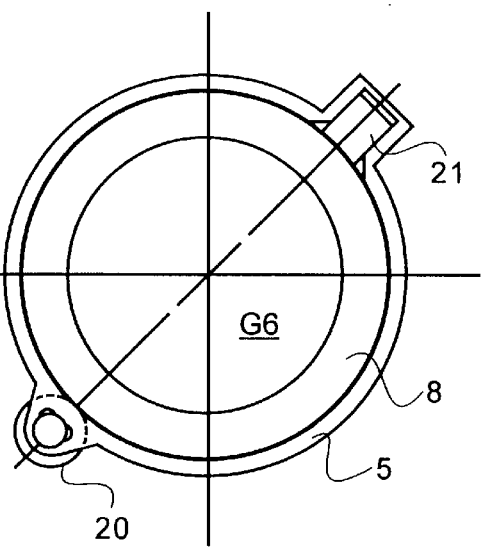
FIG. 22 is a view of the variable magnification optical system and the lens-barrel shown in FIG. 21 as seen from the image-side thereof (from the right-side in FIG. 21) along the optical axis.

FIG. 21 is a cross-sectional view illustrating the configuration of a lens-barrel having the two-stage barrel accommodating structure in a variable magnification optical system according to Embodiment 3 of the present invention. FIG. 22 is a view of the variable magnification optical system and the lens-barrel seen from the image-side thereof (the right side in FIG. 21) along the optical axis. FIG. 1 illustrates the accommodated state in which the variable magnification optical system is put away in the main body of the camera.

Figure 23:
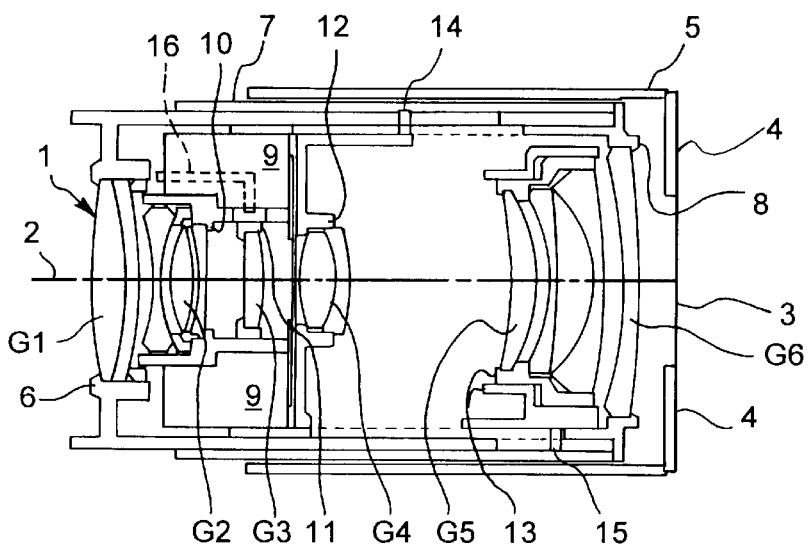
FIG. 23 is a cross-sectional view similar to FIG. 21 and illustrates the variable magnification optical system and the lens-barrel in wide-angle state.
Figure 24:
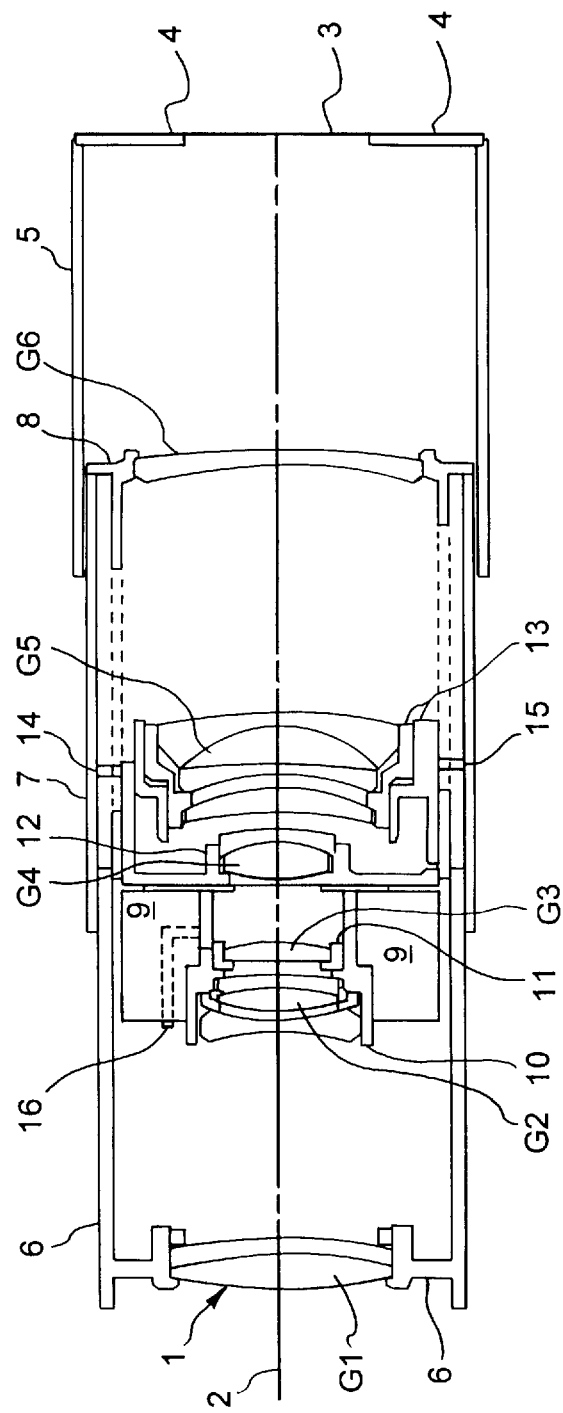
FIG. 24 is a cross-sectional view similar to FIG. 21 and illustrates the variable magnification optical system and the lens-barrel in the telephoto state.

FIG. 23 is a cross-sectional view similar to FIG. 1 and illustrates the variable magnification optical system and the lens-barrel in the wide-angle state. FIG. 24 is a cross-sectional view similar to FIG. 21 and illustrates the variable magnification optical system and the lens-barrel in the telephoto state.

The variable magnification optical system 1 includes a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a negative refractive power. The groups G1–G6 are arranged from the object in this order. On the image-side of the sixth lens group G6, which is disposed closest to the image in the variable magnification optical system 1 and, therefore, corresponds to the end lens group Ge having negative refractive power, an aperture for a film 4 and a film face 3 are provided.

The first lens group G1, which is disposed closest to the object in the variable magnification optical system 1, is attached to the first lens-barrel 6 and moves integrally with the first lens-barrel 6. The second lens group G2, the third lens group G3 and the fourth lens group G4 are supported in the first lens chamber 10, the second lens chamber 11 and the third lens chamber 12, respectively.

The second lens chamber 11 and the first lens chamber 10 are engaged with each other via helicoids. The first lens chamber 10 and the third lens chamber 12 are attached to the front side and the back side of a shutter unit 9, respectively. The fifth lens chamber G5 is supported in the fourth lens chamber 13. The sixth lens group G6 is supported by a straightforward barrel 8.

A guide pin 14 is formed on the outer periphery of the third lens chamber 12 which holds the fourth lens group G4, while a guide pin 15 is formed on the outer periphery of the fourth lens chamber 13 which holds the fifth lens group G5. The guide pins 14 and 15 are engaged with cam grooves (zoom cams) formed on the inner wall of the second lens-barrel 7 via straightforward grooves of the straightforward barrel 8, respectively.

The first lens-barrel 6 and the second lens-barrel 7 are engaged with each other via helicoids. More specifically, the helicoids are capable of being engaged with each other and are formed on the outer wall of the first lens-barrel 6 and the inner wall of the second lens-barrel 7. A gear and a helicoid are provided on the outer periphery of the second lens-barrel 7. The gear of the second lens-barrel 7 is engaged with a gear held in a black box 5 while the helicoid on the outer periphery of the second lens-barrel 7 is engaged with a helicoid provided on the inner wall of the black box 5. The black box 5 has a function of attaching the zoom lens to the main body of the camera.

When a rotation driving force generated by a driving motor (not shown) is transmitted to a gear 20 via a plurality of gears (not shown), the gear 20 rotates, and the second lens-barrel 7 engaged with the gear 20 is sent out along the optical axis 2 while rotating along the helicoid.

When the second lens-barrel 7 rotates, the first lens-barrel 6 is sent out along the optical axis 2 while rotating relative to the second lens-barrel 7 along the helicoids formed on the inner wall of the second lens-barrel 7. The helicoidal angle of the first lens-barrel 6 and the second lens-barrel 7 and the helicoidal angle of the second lens-barrel 7 and the black box 5 are determined so that the first lens-barrel 6 moves straight relative to the black box 5 (i.e., along the optical axis 2). This movement of the first lens-barrel 6 along the optical axis 2 allows the first lens group G1 to move in the optical axis direction integrally with the first lens-barrel 6. The straightforward barrel 8 is attached in the second lens-barrel 7. The rotation of the straightforward barrel 8 is suppressed by a rotation stopper 21 in the black box 5. Thus, the second lens-barrel 7 moves along the optical axis 2 while rotating, and the straightforward barrel 8 moves along the optical axis 2 integrally with the second lens-barrel 7 without rotating. The movement of the straightforward barrel 8 in the second lens-barrel 7 along the optical axis allows the sixth lens group G6 to move in the optical axis direction integrally with the straightforward barrel 8 and therefore with the second lens-barrel 7.

The straightforward barrel 8 includes straightforward grooves provided thereon. The straightforward grooves are used for guiding the guide pins 14 and 15 along the optical axis 2. Moreover, zoom cams A and B (not shown) are provided on the inner wall of the second lens-barrel 7 for receiving and holding the guide pins 14 and 15. Therefore, when the second lens-barrel 7 moves in the optical axis direction while rotating by the rotation driving force of the driving motor, the second lens group G2 to the fourth lens group G4 move straight in the optical axis direction in accordance with the zoom cam A while the rotations thereof are suppressed due to the straightforward grooves. The fifth lens group G5 moves straight in the optical axis direction in accordance with the zoom cam B while the rotation thereof is suppressed due to the straightforward grooves.

During the focusing operation, the third lens group G3 is rotationally driven by a rotation lever 16 provided in the shutter unit 9 so as to move relative to the shutter unit 9 in accordance with the helicoid.

Figure 25:
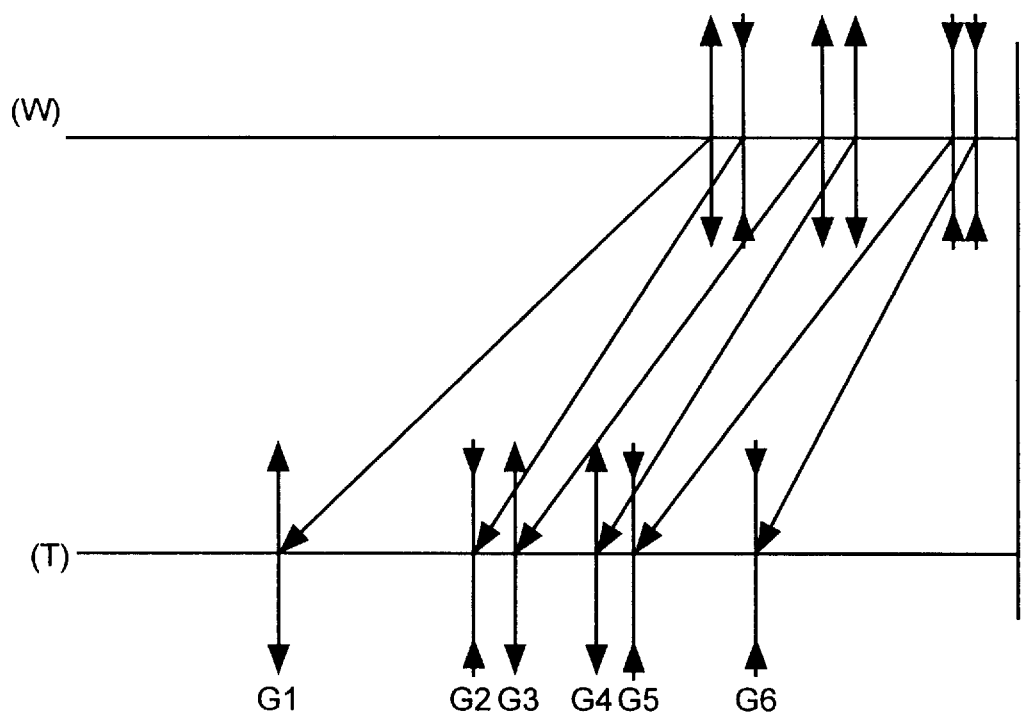
FIG. 25 is a diagram showing a distribution of refractive power in the variable magnification optical system according to the embodiment of the present invention shown in FIG. 21 and illustrates a manner in which the respective lens groups move when a lens group position state is changed from the wide-angle state (W) to the elephoto state (T).

FIG. 25 illustrates distribution of refractive power in the variable magnification optical system according to Embodiment 3 and manners in which the respective lens groups moves when the state of the lens group positions is changed from the wide-angle state (W) to the telephoto state (T).

As shown in FIG. 25, the variable magnification optical system according to Embodiment 1 includes a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a negative refractive power. The groups G1 to G6 are arranged from the object in this order. When the state of the lens group positions is changed from the wide-angle state (W) to the telephoto state (T), all of the lens groups move toward the object so that the space between the first lens group G1 and the second lens group G2 increases, the space between the second lens group G2 and the third lens group G3 decreases, the space between the third lens group G3 and the fourth lens group G4 increases, the space between the fourth lens group G4 and the fifth lens group G5 decreases, and the space between the fifth lens group G5 and the sixth lens group G6 increases.

Figure 26:
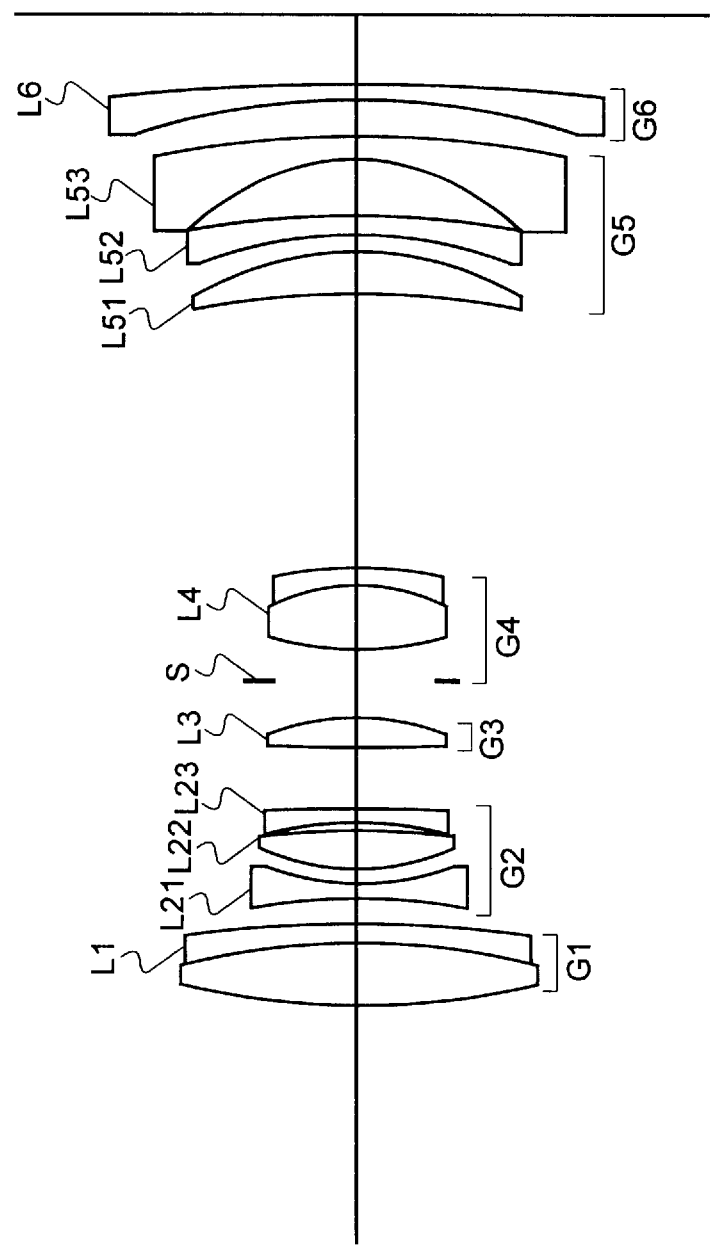
FIG. 26 is a view showing the lens arrangement in the variable magnification optical system according to the embodiment of the present invention shown in FIG. 21.

FIG. 26 shows the lens arrangement of the variable magnification optical system according to Embodiment 3 of the present invention.

In the variable magnification optical system of FIG. 26, the first lens group G1 is composed of a composite positive lens L1 having a double-convex lens and a negative meniscus lens with the concave face facing the object which are arranged from the object in this order.

The second lens group G2 is composed of a double-concave lens L21, a double-convex lens L22 and a negative meniscus lens L23 with the concave face facing the object which are arranged from the object in this order.

The third lens group G3 is composed of a double-convex lens L3.

The fourth lens group G4 is composed of a composite positive lens L4 having a double-convex lens and a negative meniscus lens with the concave face facing the object which are arranged from the object in this order.

The fifth lens group G5 is composed of a positive meniscus lens L51 with the concave face facing the object, a negative meniscus lens L52 with the concave face facing the object and a negative meniscus lens L53 with the concave face facing the object which are arranged from the object in this order.

The sixth lens group G6 is composed of a negative meniscus lens L6 with the concave face facing the object.

An aperture diaphragm S is provided between the third lens group G3 and the fourth lens group G4.

FIG. 26 shows the positional relationship among the lens groups in the wide-angle state. The lens groups move on the optical axis along the respective zoom orbits shown by arrows in FIG. 25 when the magnification changes to the telephoto state. In Embodiment 3, the space between the second lens group G2 and the fourth lens group G4 is constant when the state of the lens group positions is changed from the wide-angle state to the telephoto state. In other words, the second lens group G2 and the fourth lens group G4 move integrally with each other when the magnification changes. In addition, with respect to the wide-angle state, a ratio of the moving amount of the first lens group G1 to that of the sixth lens group G6 in a given state of the lens group positions is always constant (i.e., 2:1).

Moreover, in Embodiment 3, the focusing operation with respect to the object located at a short distance is conducted by moving the third lens group G3 toward the image along the optical axis.

Various values associated with Embodiment 3 of the present invention are listed in Table (3). In Table (3), f denotes, in mm, the focal length, FNO denotes f-number, 2ω denotes an angle of view, Bf denotes, in mm, the back focal length, and D0 denotes, in mm, a distance along the optical axis from the object to the face located closest to the object. The face number indicates the order of the lens face from the object-side along a direction in which light rays travel. Values indicated as the refractive index and Abbe number are values for the d-line (λ=587.6 nm). In Table (3), a face having a radius of curvature of ∞ (infinite) indicates a plane. Furthermore, although the face corresponding to the aperture diaphragm S is indicated as a face having the radius of curvature of ∞ in Table 3, there is no actual face at the face corresponding to the aperture diaphragm s.

TABLE 3 f = 38.80 ~ 75.35 ~ 113.02 ~ 153.20
FNO = 4.30 ~ 6.88 ~ 8.99 ~ 11.01
2ω = 58.29 ~ 31.01 ~ 17.96 ~ 15.69°

| Surface number | Radius of curvature | Interval between the surfaces | Refractive index | Abbe number |
|---|---|---|---|---|
| 1 | 59.4129 | 4.2698 | 1.48749 | 70.45 |
| 2 | −37.9306 | 1.3814 | 1.84666 | 23.83 |
| 3 | −63.2599 | (d3 variable) | | |
| 4 | −30.9582 | 1.0047 | 1.83500 | 42.97 |
| 5 | 20.5865 | 1.0047 | | |
| 6 | 18.8731 | 2.6372 | 1.78472 | 25.70 |
| 7 | −47.1212 | 0.5023 | | |
| 8 | −20.6854 | 1.0047 | 1.83500 | 42.97 |
| 9 | −135.8101 | (d9 variable) | | |
| 10 | 323.8179 | 2.0093 | 1.48749 | 70.45 |
| 11 | −19.4306 | (d11 variable) | | |
| 12 | ∞ | 2.2605 | (Aperture diaphragm S) | |
| 13 | 27.6565 | 4.3953 | 1.48749 | 70.45 |
| 14 | −12.2958 | 1.2558 | 1.84666 | 23.83 |
| 15 | −22.8266 | (d15 variable) | | |
| 16 | −49.9703 | 3.0140 | 1.84666 | 23.83 |
| 17 | −20.6312 | 1.2583 | | |

TABLE 3-continued

| 18 | −26.6528 | 1.2583 | 1.78800 | 47.50 |
|---|---|---|---|---|
| 19 | −65.6297 | 3.9296 | | |
| 20 | −14.9671 | 1.5070 | 1.78800 | 47.50 |
| 21 | −64.1269 | (d21 variable) | | |
| 22 | −51.9711 | 1.0047 | 1.62041 | 60.35 |
| 23 | −157.2480 | (Bf) | | |

(Variable intervals when zooming from the wide-angle state to the telephoto state)

| | wide-angle | mid-angle | | Telephoto-angle |
|---|---|---|---|---|
| f | 38.8039 | 75.3465 | 113.0189 | 153.2019 |
| d3 | 1.6326 | 11.9215 | 19.1983 | 26.2823 |
| d9 | 4.3754 | 2.8045 | 2.3398 | 1.8837 |
| d11 | 2.5316 | 4.1025 | 4.5672 | 5.0233 |
| d15 | 18.6826 | 9.6691 | 4.9215 | 1.8837 |
| d21 | 2.5116 | 12.6690 | 20.5388 | 28.2532 |
| Bf | 5.0227 | 16.4559 | 26.8561 | 36.2226 |

(Focusing moving amount of the third lens group G3 when the magnification is −1/30)

| Focal length f | 38.8039 | 75.3465 | 113.0189 | 153.2019 |
|---|---|---|---|---|
| D0 | 1117.0386 | 2182.0510 | 3276.2251 | 4447.4776 |
| Moving amount | 1.0769 | 0.8390 | 0.8086 | 0.7919 |

The sign of the moving amount is determined to be positive when the lens group moves toward the image.

(Values for the above conditions)

f1=83.0700 fn=−32.4091 fe=−125.5812

TLt=130.8522

(1) fn/fe −0.2581

(2) f1/(fw·ft)$^{1/2}$−1.077

(3) Bft/TLt −0.277

In Embodiment 3, the first lens group G1, which is disposed closest to the object, is designed to have the positive refractive power and the sixth lens group G6 which is disposed closest to the image and corresponds to the end lens group Ge, is designed to have the negative refractive power. Therefore, the total lens length can be shortened and the lens diameter can be reduced.

In Embodiment 3, the first lens group G1, which moves integrally with the first lens-barrel, is disposed closest to the object in the first lens-barrel in the two-stage barrel accommodating structure. In addition, the sixth lens group G6, which moves integrally with the straightforward barrel, is disposed closest to the image in the second lens-barrel. Furthermore, the moving amount ratio of the first lens group G1 to the sixth lens group G6 from the wide-angle state to a given state of the lens group positions is always constant, i.e., 2:1, and is equal to the moving amount ratio of the first lens-barrel to the second lens-barrel. Accordingly, in Embodiment 3, the number of the movable lens groups can be increased without making the lens-barrel structure complicated, thereby realizing a small-sized variable magnification optical system with an increased zoom ratio.

Embodiment 4

Figure 27:
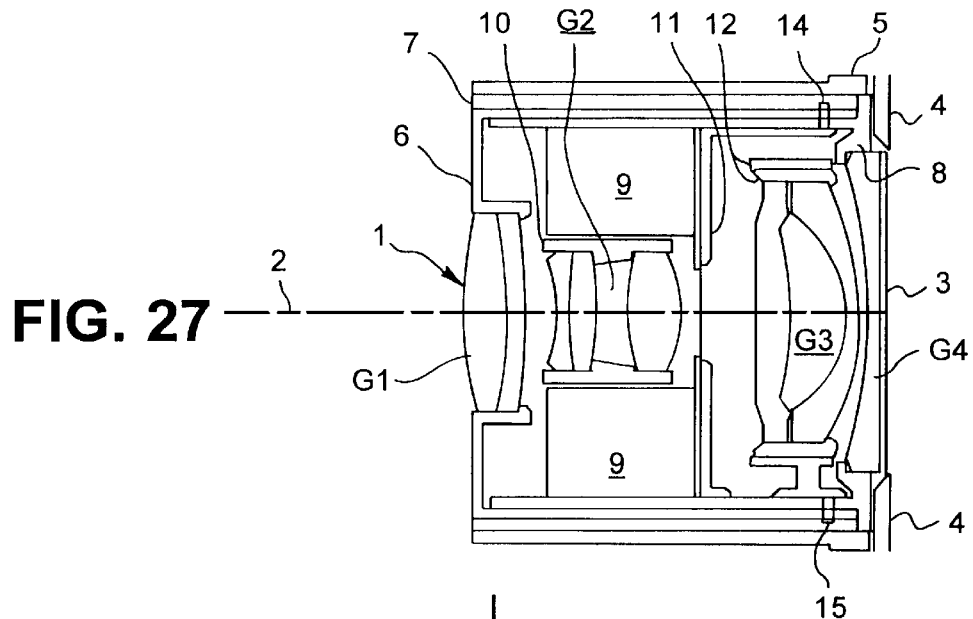
FIG. 27 is a cross-sectional view illustrating the configuration of the lens-barrel having a two-stage accommodating structure in a variable magnification optical system according to another embodiment of the present invention.
Figure 28:
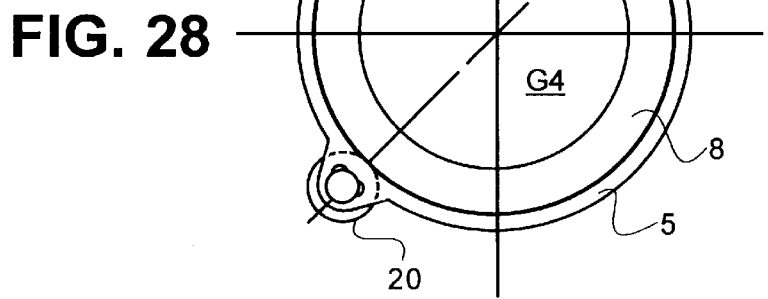
FIG. 28 is a view of the variable magnification optical system and the lens-barrel shown in FIG. 27 as seen from the image-side thereof (from the right-side in FIG. 27) along the optical axis.

FIG. 27 is a cross-sectional view illustrating the configuration of a lens-barrel having a two-stage barrel accommodating structure in a variable magnification optical system according to Embodiment 4 of the present invention. FIG. 28 is a view of the variable magnification optical system and the lens-barrel as seen from the image-side thereof (the right side in FIG. 27) along the optical axis. FIG. 28 illustrates the accommodated state in which the variable magnification optical system is put away in the main body of the camera.

Figure 29:
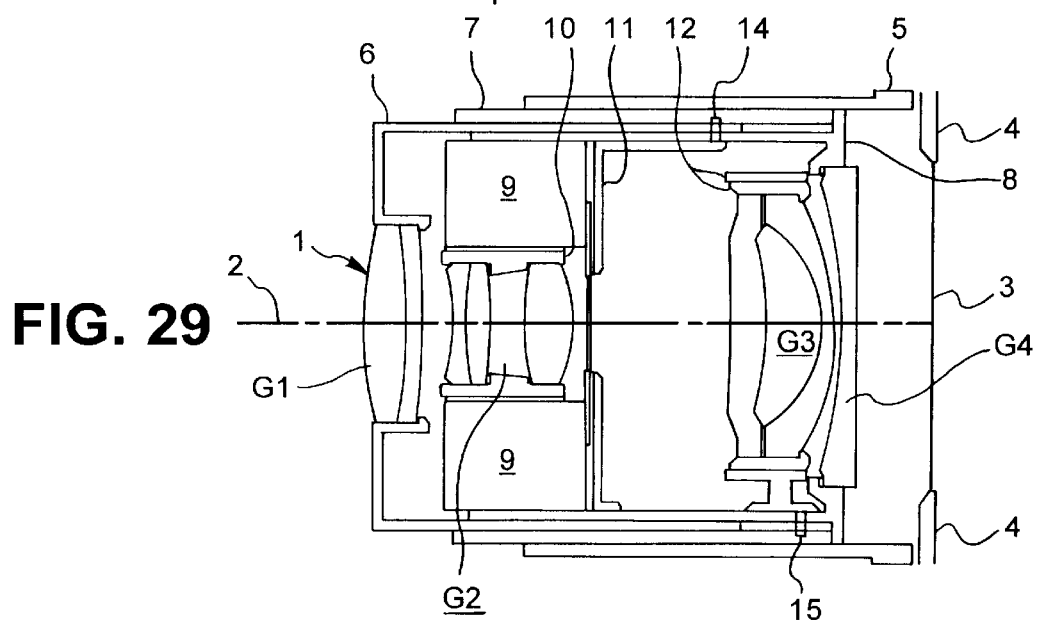
FIG. 29 is a cross-sectional view similar to FIG. 27 and illustrates the variable magnification optical system and the lens-barrel in he wide-angle state.
Figure 30:
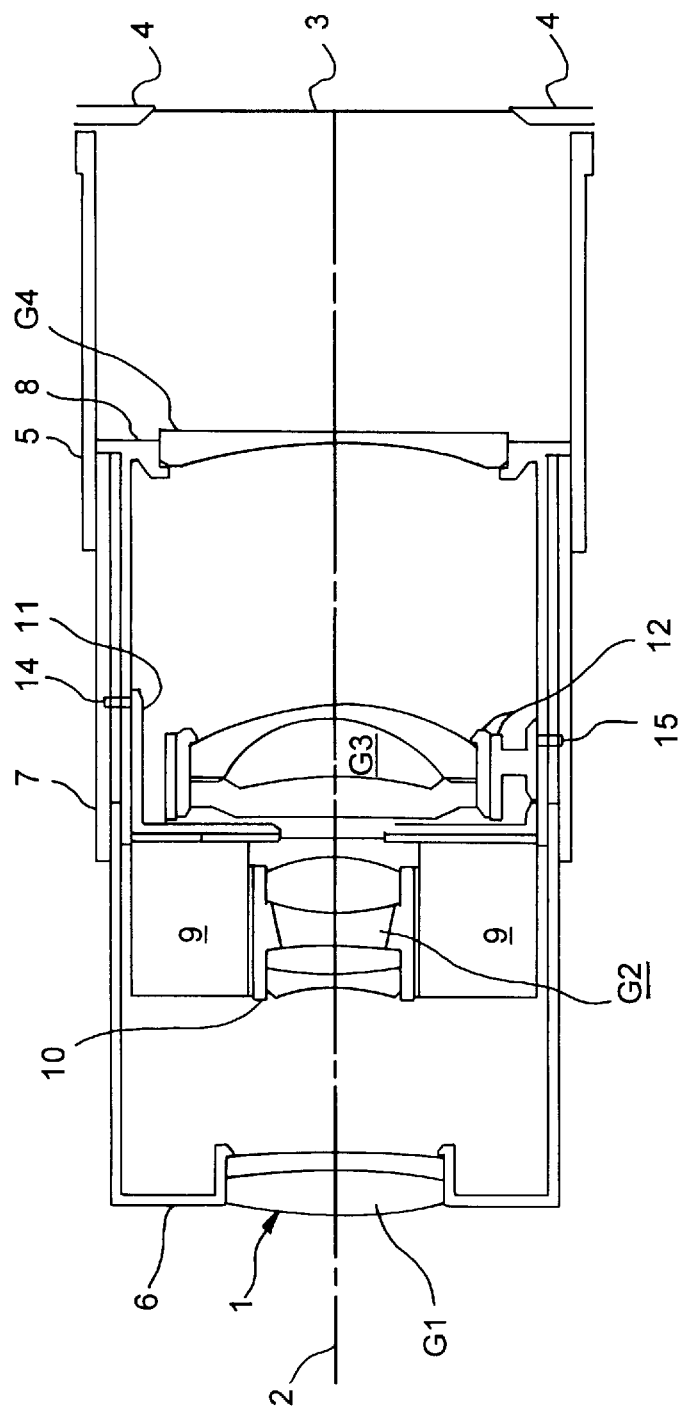
FIG. 30 is a cross-sectional view similar to FIG. 27 and illustrates the variable magnification optical system and the lens-barrel in the telephoto state.

FIG. 29 is a cross-sectional view similar to FIG. 27 and illustrates the variable magnification optical system and the lens-barrel in the wide-angle state. FIG. 30 is a cross-sectional view similar to FIG. 27 and illustrates the variable magnification optical system and the lens-barrel in the telephoto state.

The variable magnification optical system 1 includes a first lens group G1 having a positive refractive power, a second lens group G2 having a positive refractive power, a third lens group G3 having a negative refractive power, and a fourth lens group G4 having a negative refractive power. The lens groups G1–G4 are arranged from the object in this order. On the image-side of the fourth lens group G4, which is disposed closest to the image among the lens groups of the variable magnification optical system 1 and, therefore, corresponds to the end lens group Ge having negative refractive power, an aperture for a film 4 and a film face 3 are provided.

The first lens group G1, which is disposed closest to the object among the lens groups of the variable magnification optical system 1 and has the positive refractive power, is attached to the first lens-barrel 6 and moves integrally with the first lens-barrel 6. The second lens group G2 and the third lens group G3 are held in the first lens chamber 10 and the third lens chamber 12, respectively.

The first lens chamber 10 and the second lens chamber 11 are attached to a shutter unit 9. The fourth lens group G4 is held by a straightforward barrel 8.

A guide pin 14 is formed on the outer periphery of the second lens chamber 11, while a guide pin 15 is formed on the outer periphery of the third lens chamber 12 which holds the third lens group G3. The guide pins 14 and 15 are engaged with cam grooves (zoom grooves) formed on the inner wall of the second lens-barrel 7 via straightforward grooves of the straightforward barrel 8, respectively.

The lens-barrel includes the first lens-barrel 6 and the second lens-barrel 7 which are tightly fitted to each other via helicoids. More specifically, the helicoids capable of being engaged with each other are formed on the outer wall of the first lens-barrel 6 and the inner wall of the second lens-barrel 7. A gear and a helicoid are provided on the outer periphery of the second lens-barrel 7. The gear of the second lens-barrel 7 is engaged with a gear held in a black box 5 while the helicoid on the outer periphery of the second lens-barrel 7 is engaged with a helicoid provided on the inner wall of the black box 5. The black box 5 has a function of attaching the zoom lens to the main body of the camera.

When a rotation driving force generated by a driving motor (not shown) is transmitted to a gear 20 via a plurality of gears (not shown), the gear 20 rotates and the second lens-barrel 7 engaged with the gear 20 is sent out along the optical axis 2 while rotating along the helicoid.

When the second lens-barrel 7 rotates, the first lens-barrel 6 is sent out along the optical axis 2 while rotating relative to the second lens-barrel 7 along the helicoid formed on the inner wall of the second lens-barrel 7. The helicoidal angle of the first lens-barrel 6 and the second lens-barrel 7 and the helicoidal angle of the second lens-barrel 7 and the black box 5 are determined so that the first lens-barrel 6 moves straight relative to the black box 5 (i.e., along the optical axis 2). This movement of the first lens-barrel 6 along the optical axis 2 allows the first lens group G1 to move in the optical axis direction integrally with the first lens-barrel 6.

The straightforward barrel 8 is attached to the second lens-barrel 7. The rotation of the straightforward barrel 8 is suppressed by a rotation stopper 21 in the black box 5. Thus, the second lens-barrel 7 moves along the optical axis 2 while rotating, and the straightforward barrel 8 moves along the optical axis 2 integrally with the second lens-barrel 7 without rotating. The movement of the straightforward barrel 8 in the second lens-barrel 7 along the optical axis allows the fourth lens group G4 to move in the optical axis direction integrally with the straightforward barrel 8 and, therefore, with the second lens-barrel 7.

The straightforward barrel 8 includes the straightforward grooves provided thereon. The straightforward grooves are used for guiding the guide pins 14 and 15 along the optical axis 2. Moreover, zoom cams A and B (not shown) are provided on the inner wall of the second lens-barrel 7 for receiving and holding the guide pins 14 and 15. Therefore, when the second lens-barrel 7 moves in the optical axis direction while rotating by the rotation driving force of the driving motor, the second lens group G2 moves straight in the optical axis direction in accordance with the zoom cam A while the rotations thereof are suppressed due to the straightforward grooves. The third lens group G3 moves straight in the optical axis direction in accordance with the zoom cam B while the rotation thereof is suppressed due to the straightforward grooves.

During focusing, the second lens group G2 is rotationally driven by a rotation lever (not shown) provided in the shutter unit 9 so as to move relative to the shutter unit 9 along the helicoid.

Figure 31:
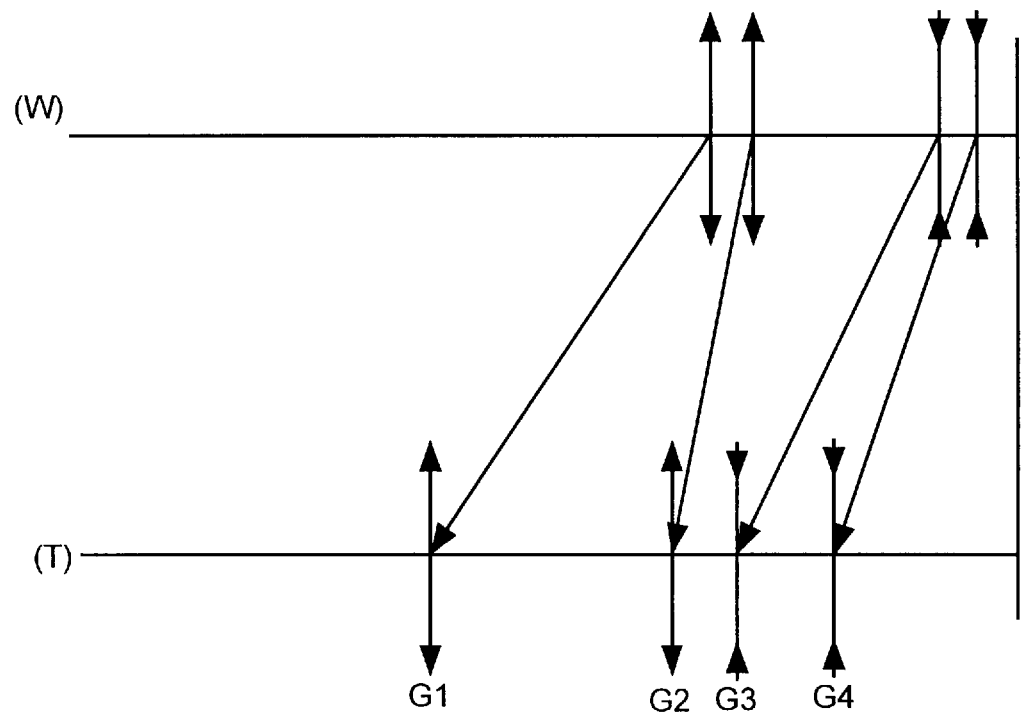
FIG. 31 is a diagram showing a distribution of refractive power in the variable magnification optical system according to the embodiment of the present invention shown in FIG. 27 and illustrates a manner in which the respective lens groups move when a lens group position state is changed from the wide-angle state (W) to the telephoto state (T).

FIG. 31 illustrates distribution of refractive power in the variable magnification optical system according to Embodiment 4 and manners in which the respective lens groups move when the state of the lens group positions changes from the wide-angle state (W) to the telephoto state (T).

As shown in FIG. 31, the variable magnification optical system according to Embodiment 4 is composed of the first lens group G1 having the positive refractive power, the second lens group G2 having the positive refractive power, the third lens group G3 having the negative refractive power, and the fourth lens group G4 having the negative power. The groups G11–G14 are arranged from the object in this order. When the state of the lens group positions changes from the wide-angle state (W) to the telephoto state (T), all of the lens groups move toward the object so that the space between the first lens group G1 and the second lens group G2 increases, the space between the second lens group G2 and the third lens group G3 decreases, and the space between the third lens group G3 and the fourth lens group G4 increases.

Figure 32:
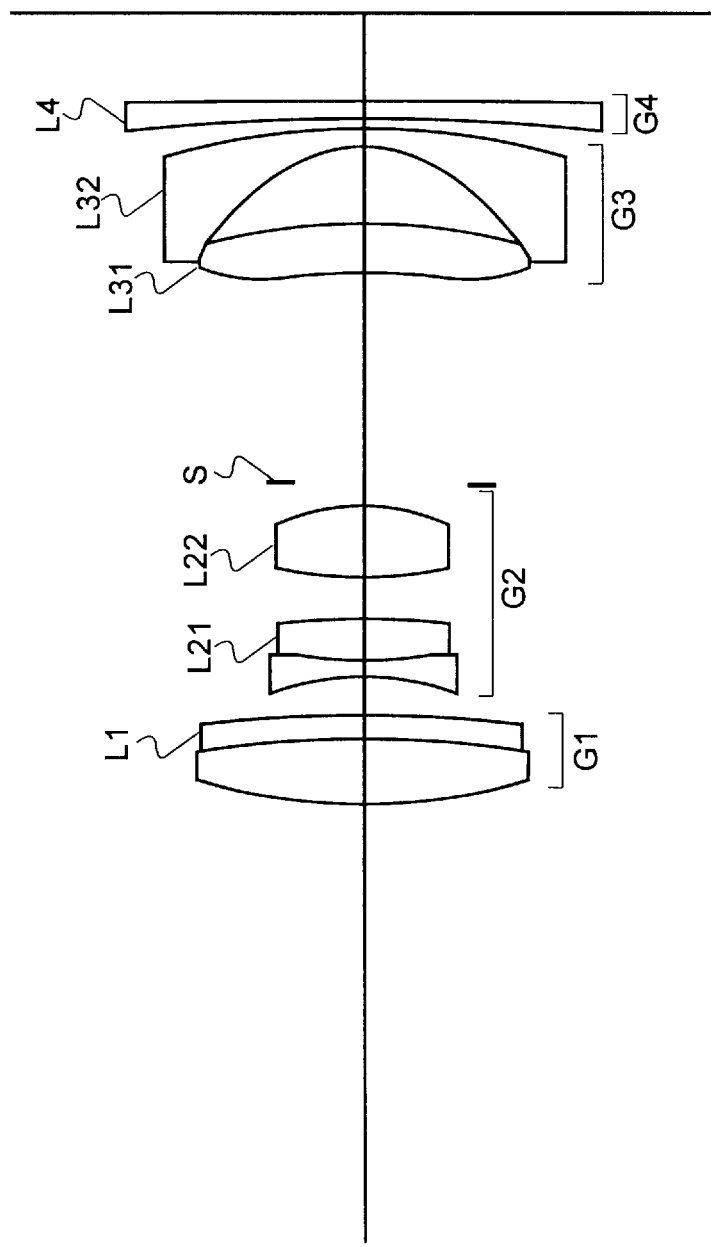
FIG. 32 is a view showing the lens arrangement in the variable magnification optical system according to the embodiment of the present invention shown in FIG. 27.

FIG. 32 shows the lens arrangement of the variable magnification optical system according to Embodiment 4 of the present invention.

In the variable magnification optical system of FIG. 32, the first lens group G1 is composed of a composite positive lens L1 having a double-convex lens and a negative meniscus lens with the concave face facing the object which are arranged from the object in this order.

The second lens group G2 is composed of a composite negative lens L21 of a double-concave lens and a double-convex lens, and a double-convex lens L22, which are arranged from the object in this order.

The third lens group G3 is composed of a positive meniscus lens L31 with the concave surface facing the object and a negative meniscus lens L32 with the concave surface facing the object, which are arranged from the object in this order.

The fourth lens group G4 is composed of a negative meniscus lens L4 with the concave surface facing the object. An aperture diaphragm S is provided between the second lens group G2 and third lens group G3.

FIG. 32 shows the positional relationship among the lens groups in the wide-angle state. The lens groups move on the optical axis along the respective zoom orbits shown by arrows in FIG. 31 when the magnification changes to the telephoto state. In Embodiment 4, with respect to the wide-angle state, a ratio of the moving amount of the first lens group G1 and that of the fourth lens group G4 in a given state of the lens group positions is always constant (i.e., 2:1).

Moreover, in Embodiment 4, the focusing operation when the object is located at a short distance is conducted by moving the second lens group G2 toward the image along the optical axis.

In Embodiment 4, an aspherical surface is expressed by the following condition (a) when the height in a direction vertical relative to the optical axis is y, the amount of displacement in the optical axis direction (i.e., sag amount) for the height y is S(y), a radius of curvature of a standard is r, a conical coefficient is κ and the n-th order coefficient for the aspherical surface is Cn:

$$S(y) = (y^2/r)/\{1 + (1 - \kappa \cdot y^2)^{1/2}\} + \qquad (a)$$
$$C_4 \cdot y^4 + C_6 \cdot y^6 + C_8 \cdot y^8 + C_{10} \cdot y^{10} + \ldots$$

The aspherical surface is denoted by adding a mark "*" to the right-side of the surface number in Table (4) shown below.

Various values associated with Embodiment 4 of the present invention are listed in Table (4). In Table (4), f denotes, in mm, the focal length, FNO denotes f-number, 2ω denotes an angle of view, Bf denotes, in mm, the back focal length, and D0 denotes, in mm, a distance along the optical axis from the object to the surface which is located closest to the object. The surface number indicates the order of the lens face from the object-side along a direction in which light rays travel. Values indicated as the refractive index and Abbe number are values for the d-line (λ=587.6 nm). In Table (4), a surface having a radius of curvature of ∞ (infinite) indicates a plane. Furthermore, although the surface corresponding to the aperture diaphragm S is indicated as a surface having the radius of curvature of ∞ in Table 4, there is no actual surface on the ace indicating the aperture diaphragm S.

TABLE 4 f = 38.80 ~ 62.79 ~ 110.50
FNO = 4.07 ~ 6.00 ~ 9.50
2ω = 56.57 ~ 36.54 ~ 21.65°

| Surface number | Radius of curvature | Interval between the surfaces | Refractive index | Abbe constant |
|---|---|---|---|---|
| 1 | 41.6230 | 4.3953 | 1.48749 | 70.45 |
| 2 | −69.0932 | 1.5070 | 1.84666 | 23.83 |
| 3 | −136.2375 | (d3 variable) | | |
| 4* | −19.4865 | 1.2558 | 1.77250 | 49.61 |
| 5 | 67.5145 | 2.5116 | 1.53172 | 48.83 |
| 6 | −60.4669 | 3.1395 | | |
| 7 | 27.6463 | 5.0233 | 1.83500 | 42.97 |
| 8* | −14.3801 | 1.8837 | | |
| 9 | ∞ | (d9 variable) | (Aperture diaphragm S) | |
| 10* | −81.7577 | 3.2651 | 1.58518 | 30.24 |
| 11 | −43.0504 | 5.4730 | | |
| 12 | −11.8920 | 1.5070 | 1.77250 | 49.61 |
| 13 | −47.8351 | (d13 variable) | | |
| 14 | −155.8237 | 1.2558 | 1.62041 | 60.35 |
| 15 | −10000.0000 | (Bf) | | |

TABLE 4-continued (Data for the aspherical surfaces)

Surface number 4

| κ | | $C_4$ | |
|---|---|---|---|
| 1.0000 | | $-2.3284 * 10^5$ | |
| $C_6$ | | $C_8$ | $C_{10}$ |
| $-1.2577 * 10^{-7}$ | | $-2.3789 * 10^{-10}$ | $1.3228 * 10^{-11}$ |

Surface number 8

| κ | | $C_4$ | |
|---|---|---|---|
| 1.0000 | | $5.7157 * 10^{-5}$ | |
| $C_6$ | | $C_8$ | $C_{10}$ |
| $5.6192 * 10^{-7}$ | | $-8.9851 * 10^{-9}$ | $4.4291 * 10^{-11}$ |

Surface number 10

| κ | | $C_4$ | |
|---|---|---|---|
| 1.0000 | | $4.8605 * 10^{-5}$ | |
| $C_6$ | | $C_8$ | $C_{10}$ |
| $1.3267 * 10^{-7}$ | | $2.2118 * 10^{-10}$ | $9.3828 * 10^{-12}$ |

(Variable intervals when magnification changes from the wide-angle state to the telephoto state)

| | wide-angle | mid-angle | Telephoto-angle |
|---|---|---|---|
| f | 38.8030 | 62.7872 | 110.5025 |
| d3 | 2.6701 | 8.6645 | 14.7356 |
| d9 | 14.0396 | 7.2512 | 1.7946 |
| d13 | 0.6279 | 9.0954 | 23.3046 |
| Bf | 6.2782 | 13.9511 | 28.7785 |

(Focusing moving amount of the second lens group G2 when the magnification is −1/40)

| Focal length f | 38.8030 | 62.7872 | 110.5025 |
|---|---|---|---|
| D0 | 1554.2933 | 2506.5670 | 4406.4031 |
| Moving amount | 0.5913 | 0.4264 | 0.2875 |

The sign of the moving amount is determined to be positive when the lens group moves toward the image.

(Values for the above conditions)
f1=79.5995
fn=−24.7892
fe=−251.1624
TLt=99.8305
(1) fn/fe=0.0987
(2) f1(fw·ft)$^{1/2}$=1.216
(3) Bft/TLt=0.288

In Embodiment 4, the first lens group G1, which is disposed closest to the object, is designed to have the positive refractive power and the fourth lens group G4, which is disposed closest to the image and corresponds to the end lens group Ge, is designed to have the negative refractive power. Therefore, the total lens length can be shortened and the lens diameter can be reduced.

In Embodiment 4, the first lens group G1, which moves integrally with the first lens-barrel, is disposed closest to the object in the first lens-barrel in the two-stage barrel accommodating structure. In addition, the fourth lens group G4, which moves integrally with the straightforward barrel, is disposed closest to the image in the second lens-barrel. Furthermore, the moving amount ratio of the first lens group G1 to the fourth lens group G4 from the wide-angle state to a given state of the lens group positions is always constant, i.e., 2:1, and is equal to the moving amount ratio of the first lens-barrel to the second lens-barrel. Accordingly, also in Embodiment 4, the number of the movable lens groups can be increased without making the lens-barrel structure complicated, thereby realizing a small-sized variable magnification optical system with an increased zoom ratio.

In the above embodiments, the first lens-barrel and the second lens-barrel are tightly fitted to each other with the helicoids. However, the present invention can be applied to a lens-barrel having a two-stage barrel accommodating structure in which the first lens-barrel and the second lens-barrel are tightly fitted to each other with cams.

According to the present invention, a variable magnification optical system suitable for size reduction and increasing a zoom ratio can be provided without making the lens-barrel structure complicated.

I claim:

1. A variable focal length optical system comprising:

a positive lens group having a positive refractive power which is disposed closest to an object; and an end lens group which is disposed closest to an image;

the positive lens group and the end lens group being moved toward the object when lens group positions are changed so that the system goes from a wide-angle state to a telephoto state;

wherein the following condition is satisfied:

$$0.3 < |\Delta Ge/\Delta G1| < 0.6;$$

when $\Delta G1$ and $\Delta Ge$ are moving amounts of the positive lens group and the end lens group, respectively, while the lens group positions are changed so that the system goes from the wide-angle state to the given state of lens group positions.

2. The variable focal length optical system according to claim 1, wherein the end lens group has a negative refractive power, and further comprising a negative lens group Gn having negative refractive power provided so as to be adjacent to an object-side of the end lens group.

3. The variable focal length optical system according to claim 2, wherein a space between the negative lens group and the end lens group is increased when the lens group positions are moved so that the system changes from the wide-angle state to the telephoto state.

4. The variable focal length optical system according to claim 2, wherein condition $0.8 < f1/(fw \cdot ft)^{1/2} < 1.4$ is satisfied when f1 is a focal length of the positive lens group, fw is a focal length of the variable magnification optical system in the wide-angle state, and ft is a focal length of the variable magnification optical system in the telephoto state.

5. The variable focal length optical system according to claim 4, wherein, when a total lens length TLt and a back focal length Bft of the variable magnification optical system in the telephoto state, the following condition is satisfied:

$$Bft/TLt < 0.5.$$

6. The variable focal length optical system according to claim 5, and further comprising at least one movable lens group provided between the positive lens group and the negative lens group, wherein the movable lens group moves along an optical axis of the variable magnification optical system when the lens group positions are moved so that the system changes from the wide-angle state to the telephoto state.

7. The variable focal length optical system according to claim 6, wherein the at least one movable lens group includes at least one lens group having positive refractive power.

8. The variable focal length optical system according to claim 6, wherein a lens group of the movable lens group located closest to the image has positive refractive power.

9. The variable focal length optical system according to claim 2, and further comprising at least two movable lens groups provided between the positive lens group and the negative lens group, wherein the movable lens groups move along an optical axis of the variable magnification optical system.

10. The variable focal length optical system according to claim 9, wherein a lens group of the movable lens groups which is located closest to the object has negative refractive power, while a lens group of the movable lens groups which is located closest to the image has positive refractive power.

11. The variable focal length optical system according to claim 1, wherein a ratio of the moving amount ΔG1 of the positive lens group when the lens group positions are changed so that the system goes from the wide-angle state to the given state to the moving amount ΔGe of the end lens group when the lens group positions are changed so that the system goes from the wide-angle state to the given state is always substantially constant.

12. The variable focal length optical system according to claim 1, wherein condition $-5<\text{fe}/(\text{fw}\cdot\text{ft})^{1/2}<1$ is satisfied when fe is a focal length of the end lens group, fw is a focal length of the optical system in the wide-angle state, and ft is a focal length of the variable magnification optical system in the telephoto state.

13. The variable focal length optical system according to claim 1, and further comprising:
 a first guide means for driving the positive lens group along an optical axis of the variable magnification optical system when the lens group positions are changed so that the system goes from the wide-angle state to the telephoto state;
 and
 a second guide means for driving the end lens group along the optical axis of the variable magnification optical system when the lens group positions are changed so that the system goes from the wide-angle state to the telephoto state;
 wherein the first guide means and the second guide means are connected to each other and a driving force supplied to the second guide means is transmitted to the first guide means.

14. The variable focal length optical system according to claim 13, wherein a ratio of a moving amount of the first guide means along the optical axis as the system goes from the wide-angle state to the given state to a moving amount of the second guide means along the optical axis as the system goes from the wide-angle state to the given state is always substantially constant.

15. The variable focal length optical system according to claim 13, wherein the positive lens group is directly held by the first guide means and the end lens group is directly held by the second guide means.

16. The variable focal length optical system comprising:
 a first lens group;
 an end lens group located closer to an image than the first lens group;
 a first supporting means for supporting the first lens group which moves integrally with the first lens group along an optical axis; and
 a second supporting means for supporting the end lens group which moves integrally with the end lens group along the optical axis;
 the second supporting means transmitting a rotational driving force applied thereto to the first supporting means and moving along the optical axis in accordance with the rotational driving force; and
 the first supporting means moving along the optical axis in accordance with the rotational driving force transmitted via the second supporting means.

17. The variable focal length optical system according to claim 16, wherein the first lens group is disposed closest to an object in the variable magnification optical system and has positive refractive power.

18. The variable focal length optical system according to claim 16, wherein the end lens group is disposed closest to the image in the variable magnification optical system, and further comprising:
 a plurality of lens groups disposed between the first lens group and the end lens group; and
 a negative lens group having negative refractive power provided adjacent to an object-side of the end lens group.

19. The variable focal length optical system according to claim 16, wherein the second supporting means includes a first portion which moves along the optical axis while rotating in accordance with the rotational driving force, and a second portion which moves along the optical axis without rotating in accordance with the rotational driving force, and the end lens group is supported by the second portion.

20. The variable focal length optical system according to claim 18, wherein the second supporting means includes a guide means for guiding the negative lens group along the optical axis, and a ratio of a moving amount of the negative lens group to a moving amount of the second supporting means varies when lens group positions are changed so that the system goes from a wide-angle state to a telephoto state.

21. The variable focal length optical system according to claim 20, wherein condition $0.03<\text{fn}/\text{fe}<0.40$ is satisfied when a focal length of the negative lens group is fn and a focal length of the end lens group is fe.

22. The variable focal length optical system according to claim 16, wherein condition $0.8<\text{f1}/(\text{fw}\cdot\text{ft})^{1/2}<1.4$ is satisfied when a focal length of the first lens group is f1, a focal length of the variable magnification optical system in the wide-angle state is fw, and a focal length of the variable magnification optical system in the telephoto state is ft.

23. The variable focal length optical system according to claim 16, wherein condition $\text{Bft}/\text{TLt}<0.5$ is satisfied when a total lens length of the variable magnification optical system in the telephoto state is TLt and a back focal length of the variable magnification optical system in the telephoto state is Bft.

* * * * *